US012217589B2

(12) United States Patent
Yamamoto

(10) Patent No.: US 12,217,589 B2
(45) Date of Patent: Feb. 4, 2025

(54) WATCHING SUPPORT SYSTEM, WATCHING SUPPORT DEVICE, AND WATCHING SUPPORT PROGRAM

(71) Applicant: OTTA INC., Fukuoka (JP)

(72) Inventor: Fumikazu Yamamoto, Fukuoka (JP)

(73) Assignee: OTTA INC., Fukuoka (JP)

( * ) Notice: Subject to any disclaimer, the term of this patent is extended or adjusted under 35 U.S.C. 154(b) by 0 days.

(21) Appl. No.: 18/716,318

(22) PCT Filed: Dec. 22, 2022

(86) PCT No.: PCT/JP2022/047437
§ 371 (c)(1),
(2) Date: Jun. 4, 2024

(87) PCT Pub. No.: WO2023/120662
PCT Pub. Date: Jun. 29, 2023

(65) Prior Publication Data
US 2024/0428671 A1 Dec. 26, 2024

(30) Foreign Application Priority Data
Dec. 24, 2021 (JP) ................................ 2021-210263

(51) Int. Cl.
*G08B 21/02* (2006.01)

(52) U.S. Cl.
CPC ..... *G08B 21/0277* (2013.01); *G08B 21/0294* (2013.01)

(58) Field of Classification Search
CPC ................................................ G08B 21/0277
See application file for complete search history.

(56) References Cited

U.S. PATENT DOCUMENTS 6,396,413 B2 * 5/2002 Hines ....................... G07C 9/28 340/8.1
2005/0116020 A1 * 6/2005 Smolucha ............... G07F 17/32 340/572.1

(Continued)

FOREIGN PATENT DOCUMENTS

JP 2010-271924 A 12/2010
JP 5891468 B1 3/2016

(Continued)

OTHER PUBLICATIONS

International Search Report, mailed Mar. 20, 2023, issued for the corresponding International patent application No. PCT/JP2022/047437, with English translation, 5 pages.

(Continued)

*Primary Examiner* — Travis R Hunnings
(74) *Attorney, Agent, or Firm* — LUCAS & MERCANTI, LLP

(57) ABSTRACT

A watching support system ensures that a person in charge of watching can be efficiently and effectively arranged in a watching system capable of detecting a position of an object person with high power efficiency and accuracy. An object person terminal transmits identification information via short-range wireless communication. A detection terminal is carried by a person in charge of watching who detects and performs watching over an object person, and transmits the identification information transmitted from the object person terminal that can be communicated to a server. The server specifies the position of the object person terminal based on information transmitted from a detection terminal, acquires watching need information regarding a necessity of watching by the person in charge of watching, and outputs an instruction regarding watching to the detection terminal based on the watching need information.

19 Claims, 8 Drawing Sheets

(56) References Cited

U.S. PATENT DOCUMENTS

| | | | | |
|---|---|---|---|---|
| 2020/0273312 | A1* | 8/2020 | Nagy ................. | G08B 21/0266 |
| 2022/0292946 | A1 | 9/2022 | Yamamoto | |

FOREIGN PATENT DOCUMENTS

| | | | |
|---|---|---|---|
| JP | 2016-045622 | A | 4/2016 |
| JP | 2019-105959 | A | 6/2019 |
| WO | 2021/039443 | A1 | 3/2021 |

OTHER PUBLICATIONS

Notice of Reason for Rejection issued for Japanese Patent Application No. 2023-523066, mailed Jul. 18, 2023, and its machine translation, 6 pages.

The International Bureau of WIPO, "The International Preliminary Report on Patentability" for the corresponding International Application No. PCT/JP2022/047437, mailed Jul. 4, 2024, with English translation, 14 pages.

* cited by examiner

WATCHING SUPPORT SYSTEM, WATCHING SUPPORT DEVICE, AND WATCHING SUPPORT PROGRAM

CROSS REFERENCE TO RELATED APPLICATION

This Application is a 371 of PCT/JP2022/047437 filed on Dec. 22, 2022, which, in turn, claims priority of Japanese Patent Application No. 2021-210263 filed on Dec. 24, 2021, and the above applications are incorporated herein by reference.

TECHNICAL FIELD

The present invention relates to a watching support system, a watching support device, and a watching support program for enabling a person in charge of watching who detects and performs watching over an object person terminal possessed by a child or the like via short-range wireless communication to appropriately perform a watching activity in order to grasp a position of a watching object person such as the child or the like.

BACKGROUND ART

For example, a guardian having a small child often worry about whether the child has arrived safely to school or a cram school without an accident or the like, and whether the child will return home safely when the child returns home. For this reason, conventionally, various efforts have been made to ensure safety of children, such as watching school routes in cooperation with local residents or the like. However, due to changes in social environment such as an increase in double-income households and an aging of the population, it is difficult to watch sufficiently. Under such circumstances, cases in which children are taken away on their way to and from school or involved in an incident never ceased, and actually tend to increase.

As a mechanism for coping with the problem described above, for example, a service that enables confirmation of position information of a child using a GPS function installed on a portable information terminal such as a smartphone is provided.

However, in a portable information terminal such as a smartphone, a terminal price, a communication charge, and the like are generally expensive, and it is considered that restriction of use due to educational reasons and the like is also necessary, and thus it is not realistic to cause each child to have a portable information terminal for the purpose of confirming position information.

Further, position detection by the GPS function has a problem that accuracy of the detected position is not sufficiently high. For example, a problem that a child is detected to be on a road or the like outside the school although the child is actually in the school, and a guardian or the like who has confirmed the position of the child becomes anxious or uncomfortable has occurred.

Furthermore, since the GPS function consumes a large amount of power, it is necessary to charge the smartphone or the like at least every several days in a case where the position is always detected using the GPS function. In this case, for example, in a case where a user forgets charging, the position of the child cannot be confirmed in an emergency.

In order to cope with such a problem, a technology using power-saving short-range wireless communication such as Bluetooth (registered trademark) without using the GPS function has also been proposed. For example, a simple Bluetooth terminal that transmits only identification information is carried by a child, and the identification information transmitted from the Bluetooth terminal is read by a reading terminal installed in a watching area such as a school route or a reading terminal such as a smartphone held by a person in charge of watching arranged in the watching area. As a result, it is possible to confirm that the child has passed the position of the read terminal (see, for example, Patent Literature 1.).

According to such a method, since short-range wireless communication is used, accuracy of position detection is high, and since the GPS function is not used, it is not necessary to frequently charge a terminal carried by a child.

CITATION LIST

Patent Literatures

Patent Literature 1: JP 5891468 B1

SUMMARY OF INVENTION

Technical Problem

In a case where the position detection technique described above is used, for example, in a school route or the like where many children pass on a daily basis, passage of a child can be confirmed by installing a reading terminal. However, it is not realistic to install reading terminals widely and comprehensively at places other than such places due to problems such as cost, space, supply of power supply and network connection, etc. Therefore, it is important to arrange a person in charge of watching at a necessary place when necessary. At present, it is necessary to make an adjustment so that local residents and the like can cooperate to arrange a person in charge of watching over the school route or the like. However, there is a problem that it is difficult to efficiently and effectively arrange a person in charge of watching because the local residents cannot clearly grasp an actual situation such as when, where, and how much watching is required and how much the person in charge of watching is insufficient. Furthermore, due to changes in the social environment such as an increase in double-income households and an aging of the population in recent years, there is also a problem that the person in charge of watching is insufficient.

The present invention has been made in view of the above circumstances. In other words, an object of the present invention is to provide a watching support system and a watching support device for ensuring that a person in charge of watching can be efficiently and effectively arranged in a watching system capable of detecting the position of an object person with high power efficiency and high accuracy.

Solution to Problem

The above object is achieved by the following means.

A watching support system includes an object person terminal, a detection terminal, and a server. The object person terminal is carried by an object person and transmits identification information via short-range wireless communication. The detection terminal is carried by a person in charge of watching who detects and performs watching over the object person, and detects an object person terminal that can be communicated via short-range wireless communication. The server registers information transmitted from the object person terminal and the detection terminal. The detection terminal includes a detection unit that detects an object person terminal that can be communicated, and a transmission unit that acquires identification information transmitted from the object person terminal and transmits the identification information to the server in a case where the object person terminal is detected by the detection unit. The server includes a specification unit that acquires the identification information transmitted from the detection terminal and information regarding the position of the detection terminal, and specifies the position of the object person terminal based on the acquired identification information and the acquired information regarding the position of the detection terminal, a need acquisition unit that acquires watching need information regarding a necessity of watching by the person in charge of watching, and an output unit that outputs an instruction regarding watching to the detection terminal based on the watching need information acquired by the need acquisition unit.

A watching support device is applied to a watching support system including: an object person terminal that is carried by an object person and transmits identification information via short-range wireless communication; and a detection terminal that is carried by a person in charge of watching who detects and performs watching over the object person and includes a detection unit that detects an object person terminal that can be communicated via short-range wireless communication and a transmission unit that acquires the identification information transmitted from the object person terminal and transmits the identification information to a server in a case where the object person terminal is detected by the detection unit. The watching support device includes: a specification unit that acquires the identification information transmitted from the detection terminal and information regarding the position of the detection terminal, and specifies the position of the object person terminal based on the acquired identification information and the acquired information regarding the position of the detection terminal; a need acquisition unit that acquires watching need information regarding a necessity of watching by the person in charge of watching; and an output unit that outputs an instruction regarding watching to the detection terminal based on the watching need information acquired by the need acquisition unit.

A watching support program is configured to cause an information processing device to function as the watching support device described above.

Effect of Invention

The watching support system of the present invention includes an object person terminal, a detection terminal, and a server. The object person terminal is carried by an object person and transmits identification information via short-range wireless communication. The detection terminal is carried by a person in charge of watching who detects and performs watching over the object person, and detects the object person terminal that can be communicated via short-range wireless communication. The server registers information transmitted from the object person terminal and the detection terminal. The detection terminal includes a detection unit that detects an object person terminal that can be communicated, and a transmission unit that acquires identification information transmitted from the object person terminal and transmits the identification information to the server in a case where the object person terminal is detected by the detection unit. The server includes: a specification unit that acquires the identification information transmitted from the detection terminal and information regarding the position of the detection terminal, and specifies the position of the object person terminal based on the acquired identification information and the acquired information regarding the position of the detection terminal; a need acquisition unit that acquires watching need information regarding a necessity of watching by the person in charge of watching; and an output unit that outputs an instruction regarding watching to the detection terminal based on the watching need information acquired by the need acquisition unit.

As a result, the watching need information regarding the necessity of watching can be acquired, and the instruction regarding watching can be output to the detection terminal based on the acquired watching need information, and thus the position of the object person can be detected with high power efficiency and high accuracy, and the person in charge of watching who holds the detection terminal can be efficiently and effectively arranged.

DESCRIPTION OF EMBODIMENTS

Figure 1:
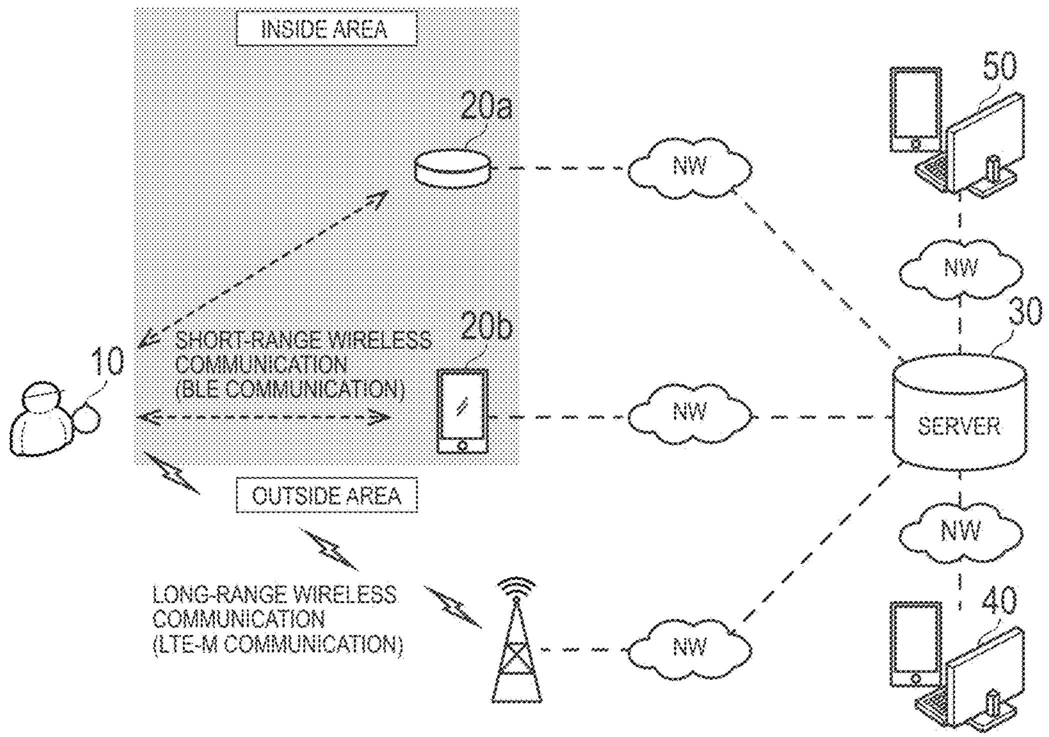
FIG. 1 is a diagram illustrating a schematic configuration of a watching support system according to an embodiment of the present invention.

Hereinafter, embodiments of the present invention will be described with reference to the attached drawings. Note that, in the description of the drawings, the same elements are denoted by the same numerals, and redundant description will be omitted. Further, dimensional ratios in the drawings are exaggerated for convenience of description, and may be different from actual ratios.

<Configuration of Watching Support System>

FIG. 1 is a diagram illustrating a schematic configuration of a watching support system according to an embodiment of the present invention.

As shown in FIG. 1, the watching support system includes an object person terminal 10, a detection terminal 20 (20*a*,

20*b*), a server 30, a guardian terminal 40, and an administrator terminal 50. Hereinafter, the detection terminal 20*a* and the detection terminal 20*b* are collectively referred to as the detection terminal 20 unless otherwise distinguished.

The object person terminal 10 communicates with the detection terminal 20 (20*a*, 20*b*) via short-range wireless communication, and is connected to the server 30 through a network via long-range wireless communication.

The detection terminal 20 (20*a*, 20*b*) communicates with the object person terminal 10 via short-range wireless communication, and is connected to the server 30 through a network via wired or wireless communication.

The server 30 is configured to be able to communicate with the object person terminal 10, the detection terminal 20 (20*a*, 20*b*), the guardian terminal 40, and the administrator terminal 50 through a network.

The guardian terminal 40 is connected to the server 30 through a network via wired or wireless communication. Hereinafter, each configuration will be described in detail.

<Object Person Terminal 10>

The object person terminal 10 is a terminal carried by a watching object person (hereinafter, also simply referred to as an "object person") such as a child or an elderly person.

Figure 2:
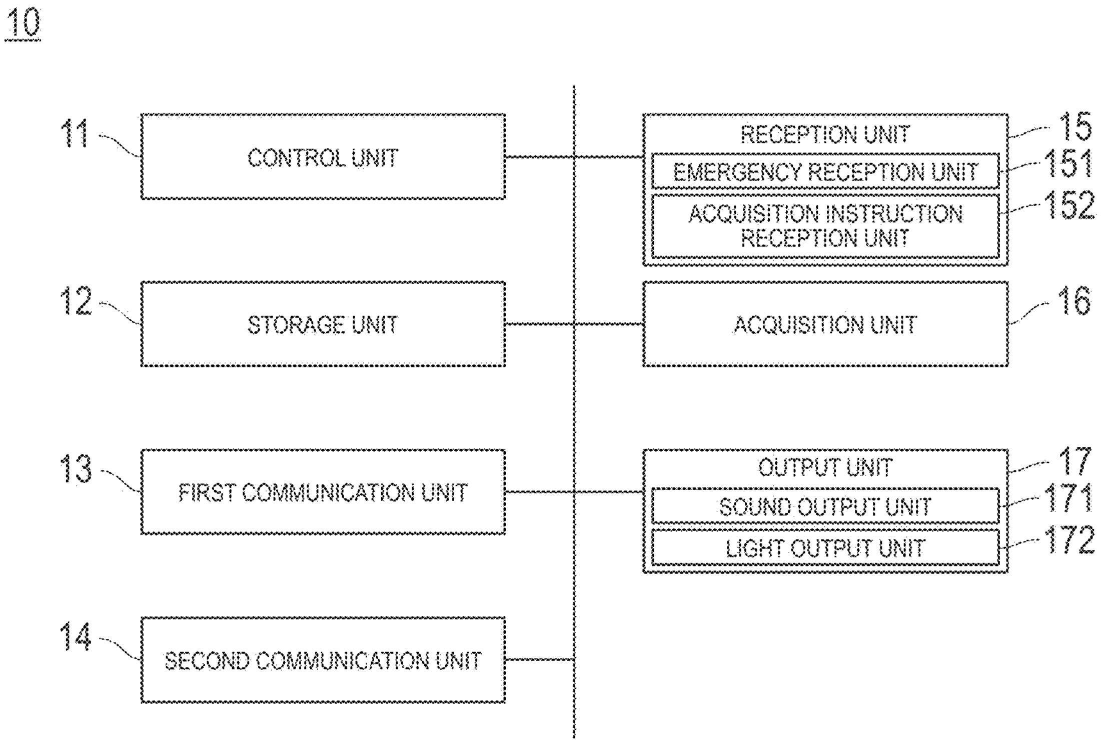
FIG. 2 is a block diagram illustrating a schematic configuration of an object person terminal.

FIG. 2 is a block diagram illustrating a schematic configuration of an object person terminal.

As shown in FIG. 2, the object person terminal 10 includes a control unit 11, a storage unit 12, a first communication unit 13, a second communication unit 14, a reception unit 15, and an acquisition unit 16. The components are communicably connected to each other via a bus.

The control unit 11 includes a CPU (Central Processing Unit), and executes control of each component described above and various arithmetic processing according to a program.

The storage unit 12 includes a ROM (Read Only Memory) that stores various programs and various data in advance, a RAM (Random Access Memory) that temporarily stores programs and data as a work region, and stores various programs and various data.

Further, the storage unit 12 stores identification information for identifying the object person terminal 10, information indicating a first time interval that is a time interval at which the first communication unit 13 transmits the identification information, a second time interval that is a time interval at which the second communication unit 14 performs communication, and the like. Further, the storage unit 12 stores various information acquired by the acquisition unit 16.

The first communication unit 13 outputs a signal for performing short-range wireless communication using, for example, the Bluetooth (registered trademark) standard, and communicates with other terminals, devices, or the like existing in proximity via short-range wireless communication. As a standard of short-range wireless communication, for example, Bluetooth 4.0 (also referred to as Bluetooth Low Energy or BLE) is used. This standard is suitably used in the present embodiment because it does not pursue a communication speed but achieves significant power saving. The first communication unit 13 performs short-range wireless communication at the first time interval, which is, for example, a relatively short time interval of about several tens of milliseconds to several seconds, and transmits the identification information for identifying the object person terminal 10 to the surroundings. The first time interval may be set to, for example, about 3 seconds.

The second communication unit 14 communicates with other terminals, devices, or the like via long-range wireless communication provided by a mobile communication carrier or the like. As a standard of long-range wireless communication, for example, LTE-M (Long Term Evolution for Machine-type-communication) is used. This standard is one of LPWA (Low Power Wide Area: wireless communication technologies that enable power saving and wide-area communication) utilizing existing LTE equipment, and is suitably used in the present embodiment because power saving and improvement of communication stability are achieved while a moderate communication speed is secured. In the present embodiment, the second communication unit 14 transmits the identification information for identifying the object person terminal 10 to the server 30 at the second time interval, which is, for example, a relatively long time interval of several minutes to several hours. The second time interval can be arbitrarily set by the user, and for example, may be selected and set by the user from among selection candidates such as 5 minutes, 10 minutes, 30 minutes, 1 hour, 2 hours, 12 hours, and the like. Further, the second time interval may be set such that different values are used in a case where the object person terminal 10 is moving and a case where the object person terminal 10 is stationary. For example, the second time interval during movement in the case where the object person terminal 10 is moving may be set to 30 minutes, and the second time interval during stationary in the case where the object person terminal 10 is stationary may be set to 1 hour. Here, whether the object person terminal 10 is moving or stationary can be determined based on, for example, detection information of an acceleration sensor (not illustrated) provided in the object person terminal 10. Furthermore, the second time interval may be set to a different value according to a stage of moving speed of the object person terminal 10. For example, different values may be set to be used according to the stage of the moving speed such that the moving speed of the object person terminal 10 is low (0 km/h to 4 km/h), medium (4 km/h to 10 km/h), or high (10 km/h to). The stage of the moving speed is not limited to the example described above, and various numbers and ranges of stages can be set.

Further, the second communication unit 14 has a GPS function of receiving a signal from a GPS satellite and acquiring position information based on the received signal. When transmitting the identification information for identifying the object person terminal 10 to the server 30 as described above, the second communication unit 14 activates the GPS function to acquire the position information, and transmits the acquired position information to the server 30 together with the identification information. As described above, the second communication unit 14 performs long-range wireless communication and position information acquisition by the GPS function at relatively long time intervals of about 1 hour in addition to using a long-range wireless communication technology that is intended to achieve power saving, and thus, further power saving is realized.

The reception unit 15 is configured to receive an instruction from an object person or the like, and includes, for example, a push button, a button on a touch panel, or the like. In the present embodiment, the reception unit 15 includes an emergency reception unit 151 for receiving an instruction regarding occurrence of any emergency, and an acquisition instruction reception unit 152 for receiving an instruction for acquiring sound information for distribution from the server 30. When the emergency reception unit 151 receives an instruction regarding the occurrence of an emergency, the control unit 11 detects the occurrence of the emergency as a detection unit. Note that, the control unit 11 may detect the occurrence of an emergency in a case where an abnormal movement such as a fall or a sudden speed change of the object person is detected based on outputs of various sensors (not illustrated) such as an acceleration sensor provided in the object person terminal 10 to detect the movement of the object person terminal 10. Further, the control unit 11 may detect the occurrence of an emergency in a case where an emergency flag to be described later is acquired from the server 30. Note that, the reception unit 15 may receive an instruction via sound acquired by a microphone or the like, or may receive an instruction via an image (including video) acquired by a camera or the like. Further, the emergency reception unit 151 and the acquisition instruction reception unit 152 of the reception unit 15 may be implemented in association with different buttons, or may be implemented in association with different operation methods such as short pressing, long pressing, and continuous pressing of one button. Further, a timing at which the emergency reception unit 151 is used is not limited to the timing at which an emergency occurs, and can be used at any timing desired by the object person.

The acquisition unit 16 is configured to acquire sound and images (video) around the object person terminal 10, and includes a microphone, a camera, and the like. The acquisition unit 16 acquires surrounding sound or images (video), for example, in a case where the emergency reception unit 151 receives an instruction regarding the occurrence of an emergency. For example, the acquisition unit 16 may repeatedly record the surrounding sound or images (video) at predetermined intervals after the occurrence of the emergency is detected. As a result, it is possible to effectively grasp the object person and surrounding conditions while suppressing power consumption. The control unit 11 stores information indicating the sound or images (video) acquired by the acquisition unit 16 in the storage unit 12 and transmits the information to the server 30 via the second communication unit 14. Furthermore, the control unit 11 controls the second communication unit 14 to acquire position information by the GPS function, and transmits a notification indicating the occurrence of an emergency to the server 30 together with the identification information and the position information of the object person terminal 10.

The output unit 17 includes a sound output unit 171 that outputs sound and a light output unit 172 that outputs light. The sound output unit 171 is a sound output interface such as a speaker or an earphone jack, and the light output unit 172 is a light source such as an LED. The sound output unit 171 or the light output unit 172 notifies the object person by sound or light that the distributed sound information is being received at the server 30. In this case, the output unit 17 also functions as an object person notification unit. As a result, in a case where a notification by sound or light in the output unit 17 is confirmed, the user can reliably and easily acquire the distributed sound information stored in the server 30 and listen to the sound only by operating the acquisition instruction reception unit 152. Note that, the light output unit 172 may be provided on the acquisition instruction reception unit 152. As a result, in a case where the light output unit 172 on the acquisition instruction reception unit 152 is emitting light, the user may operate the acquisition instruction reception unit 152, and can more reliably and easily acquire the distributed sound information stored in the server 30 and listen to the sound. Further, the output unit 17 may include a video output interface such as a display or a video output terminal as an image output unit, and execute various notifications by images (video).

Since the object person terminal 10 in the present embodiment is intended to achieve power saving as described above with respect to wireless communication, which normally consumes a large amount of power, for example, in a case where a small secondary battery such as a rechargeable lithium ion battery is used, the object person terminal can operate without charging for about one month, and can operate for about several months to one year without charging depending on settings and usages.

<Detection Terminal 20 (20*a*, 20*b*)>

The detection terminal 20 is a terminal that exists in an area including a watching area of the object person and detects the object person terminal 10 that can be communicated via short-range wireless communication. The detection terminal 20*a* is a fixed terminal installed at a predetermined position included in the watching area, and the detection terminal 20*b* is a mobile terminal provided on a moving object such as a person and a vehicle that moves in an area including the watching area. A moving object such as a person or a vehicle including the detection terminal 20*b* functions as a person in charge of watching. Examples of the vehicle include various vehicles such as a private car, a taxi, a bus, and a train. For example, the detection terminal 20 may be configured by installing a dedicated application in a general-purpose information terminal such as a smartphone or a tablet PC, or may be configured as a dedicated terminal having a minimum configuration as described below.

Figure 3:
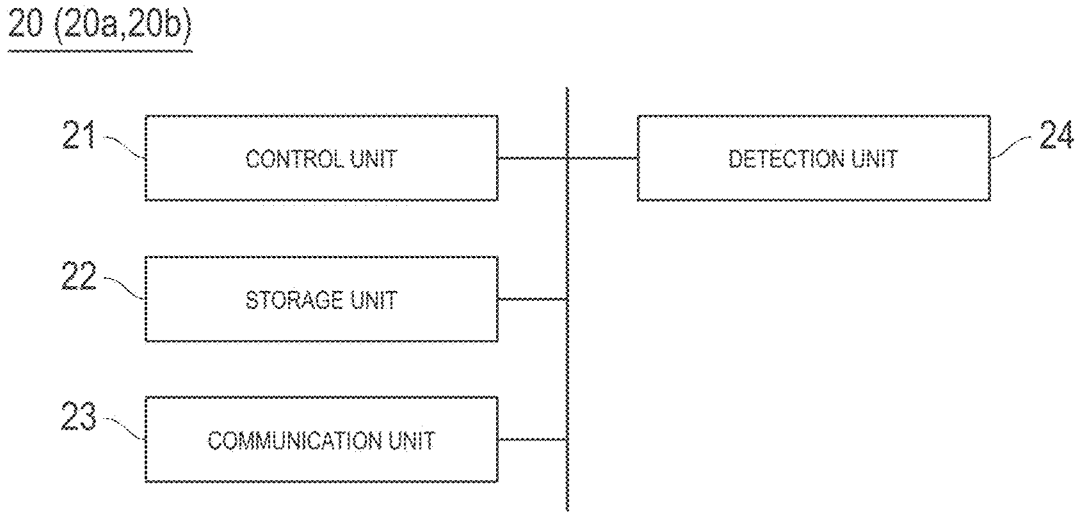
FIG. 3 is a block diagram illustrating a schematic configuration of a detection terminal.

FIG. 3 is a block diagram illustrating a schematic configuration of a detection terminal.

As shown in FIG. 3, the detection terminal 20 includes a control unit 21, a storage unit 22, a communication unit 23, and a detection unit 24. The components are communicably connected to each other via a bus. Since the control unit 21 and the storage unit 22 of the detection terminal 20 have the same configurations as the control unit 11 and the storage unit 12 of the object person terminal 10, respectively, the description thereof will be omitted.

The communication unit 23 is configured to communicate with other terminals, devices, and the like via a network. The communication unit 23 transmits and receives various information to and from the server 30, for example.

The detection unit 24 is configured to detect the object person terminal 10 that can be communicated via short-range wireless communication such as Bluetooth described above. As described above, the object person terminal 10 performs communication via short-range wireless communication by the first communication unit 13. For example, when receiving the identification information transmitted by the first communication unit 13 of the object person terminal 10, the detection unit 24 can detect the object person terminal 10 as an object person terminal 10 that can be communicated.

In a case where the object person terminal 10 is detected by the detection unit 24, the control unit 21 transmits the identification information of the object person terminal 10 to the server 30 as a transmission unit.

Since the detection terminal 20*a* is a fixed terminal, information regarding the position of each detection terminal 20*a* is stored in advance in a storage unit 32 of the server 30 in association with information for identifying the detection terminal 20*a*. When transmitting the identification information of the object person terminal 10 detected by the detection unit 24 to the server 30, the detection terminal 20*a* also transmits information for identifying the detection terminal 20*a* to the server 30. As a result, when receiving the identification information of the object person terminal 10 from the detection terminal 20*a*, the server 30 can acquire the information regarding the position of the detection terminal 20*a* from the storage unit 32 using the information for identifying the detection terminal 20*a* received together.

On the other hand, since the detection terminal 20*b* is a mobile terminal, information regarding the position of each detection terminal 20*b* is acquired based on a signal from a GPS satellite by the GPS function of each detection terminal 20*b*. When transmitting the identification information of the object person terminal 10 detected by the detection unit 24 to the server 30, the detection terminal 20*b* transmits information indicating the position of the detection terminal 20*b* together. As a result, when receiving the identification information of the object person terminal 10 from the detection terminal 20*b*, the server 30 can acquire the information indicating the position of the detection terminal 20*b* based on the information received together.

For example, in a case where the detection terminal 20*b*, which is a mobile terminal, is configured by a smartphone, a tablet PC, or the like, the detection terminal further has a configuration of a general information terminal such as an operation unit and a display unit (a touch panel display, etc.). In this case, the detection terminal 20 can also be used as a guardian terminal 40 and an administrator terminal 50 to be described later.

<Server 30>

The server 30 is an information processing device operated by, for example, a provider of a service that specifies and notifies position information. In the present embodiment, the server 30 functions as a watching support device.

Figure 4:
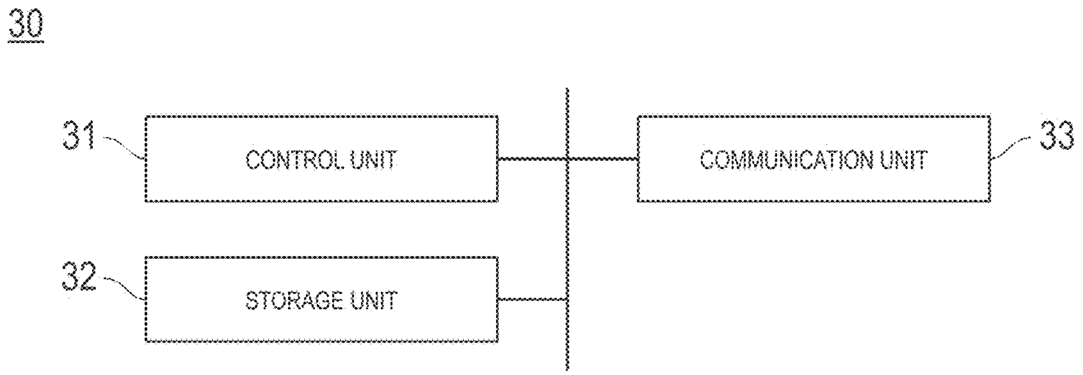
FIG. 4 is a block diagram illustrating a schematic configuration of a server.
Figure 5:
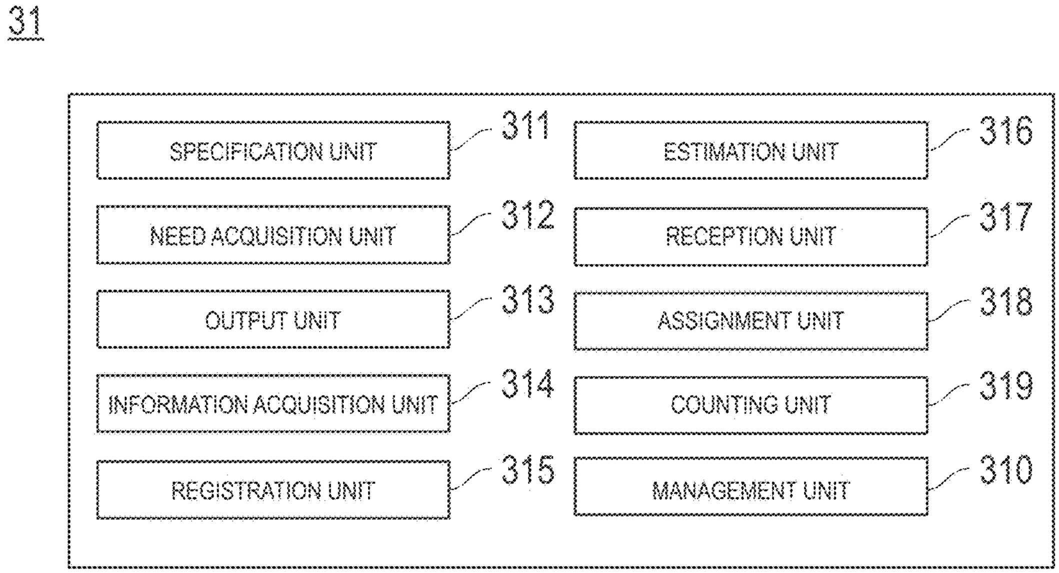
FIG. 5 is a block diagram illustrating a functional configuration of the server.

FIG. 4 is a block diagram illustrating a schematic configuration of a server. FIG. 5 is a block diagram illustrating a functional configuration of the server.

As shown in FIG. 4, the server 30 includes a control unit 31, a storage unit 32, and a communication unit 33. The components are communicably connected to each other via a bus. Since the configurations of the control unit 31, the storage unit 32, and the communication unit 33 of the server 30 are similar to those of the control unit 21, the storage unit 22, and the communication unit 23 of the detection terminal 20, respectively, the description thereof will be omitted.

As shown in FIG. 5, the control unit 31 functions as a specification unit 311, a need acquisition unit 312, and an output unit 313 by reading a program and executing processing.

The specification unit 311 acquires the identification information transmitted from the detection terminal 20 and information regarding the position of the detection terminal 20, and specifies the position of the object person terminal 10 based on the acquired identification information and the acquired information regarding the position of the detection terminal 20.

The need acquisition unit 312 acquires watching need information regarding a necessity of watching by the person in charge of watching. The need acquisition unit 312 acquires, as the watching need information, information regarding at least one of a date and time, a day of the week, a time zone, a place, a route, and a range in which watching is required. The need acquisition unit 312 acquires the watching need information, for example, by receiving an instruction from the person in charge of watching or a user who manages the person in charge of watching.

The output unit 313 outputs an instruction regarding watching to the detection terminal 20*b* based on the watching need information acquired by the need acquisition unit 312.

Further, the control unit 31 may function as an information acquisition unit 314, a registration unit 315, an estimation unit 316, a reception unit 317, an assignment unit 318, a counting unit 319, and a management unit 310.

The information acquisition unit 314 acquires information regarding an action history of the object person, incident and accident information regarding occurrence of a traffic accident or an incident, weather information regarding weather or a weather forecast, warning information regarding occurrence of a suspicious person, a lost child, or wandering, and the like. The information regarding the action history of the object person is acquired, for example, by analyzing information regarding a transition of the position of each object person terminal 10 stored in the storage unit 32. Further, the incident and accident information regarding the occurrence of a traffic accident or an incident is acquired from, for example, websites or databases of a local government, police, or the like, or an input of a person in charge, and the like. The weather information regarding weather or a weather forecast is acquired from, for example, a website of a local government, databases of various weather forecast services, or an input of a person in charge, and the like. Further, the warning information regarding the occurrence of a suspicious person, a lost child, or wandering is acquired from, for example, websites or databases of a local government, police, schools, hospitals, nursing care facilities, or the like, or an input of a person in charge, and the like.

The registration unit 315 receives registration of activity information regarding at least one of a date and time, a day of the week, a time zone, a place, a route, and a range in which the person in charge of watching can perform a watching activity.

The estimation unit 316 estimates information regarding at least one of a moving distance, the number of steps, and an energy consumption amount of the person in charge of watching who carries the detection terminal 20*b* based on the information regarding the position of the detection terminal 20*b* acquired by the specification unit 311.

The reception unit 317 receives settings of a watching point that can be assigned to at least one of the date and time, the day of the week, the time zone, the place, the route, and the range in which watching is required.

The assignment unit 318 assigns a corresponding watching point to the person in charge of watching who performed watching in a date and time, a day of the week, a time zone, a place, a route, or a range in which the watching point that can be assigned is set by the reception unit 317.

The counting unit 319 counts the watching points assigned to each person in charge of watching by the assignment unit 318.

The management unit 310 manages the watching points of each person in charge of watching, which are counted by the counting unit 319, so that they can be used as electronic money.

Further, the control unit 31 outputs information regarding the position of the object person terminal 10 specified by the specification unit 311. The control unit 31 may output the information regarding the position by coordinate information such as two-dimensional or three-dimensional, or may convert the coordinate information into an address, an area name, or the like according to a predetermined rule and output the converted information as the address or the area name.

The storage unit 32 stores, as information regarding the object person and the object person terminal 10, the identification information of the object person terminal 10, attribute information such as a name and an age of the object person who holds the object person terminal 10, attribute information such as a name and a contact address of a guardian of the object person, and the like in association with each other.

Further, the storage unit 32 stores, as information regarding the detection terminal 20, identification information of the detection terminal 20, attribute information indicating whether the detection terminal 20 is a fixed terminal or a mobile terminal or the like, and in a case where the detection terminal is a fixed terminal, information regarding the position of the detection terminal 20 and the like in association with each other.

Further, the storage unit 32 also stores a time setting flag for setting the second time interval of the object person terminal 10, flag information regarding an emergency flag, a sound distribution flag, and the like, information regarding a range of a watching area for setting various flags, and the like. The range of the watching area may be defined by a range of coordinate information such as two-dimensional or three-dimensional, or may be defined by an address, an area name, or the like corresponding to the range of coordinate information. Further, the storage unit 32 also stores information regarding a predetermined range that the object person terminal 10 is assumed to be easily outside the watching area in the watching area, information regarding an environment of each area in the watching area, information regarding a degree of risk according to the environment, information regarding a degree of risk according to a time zone of each area, and the like. Further, the storage unit 32 also stores a value of the second time interval set for each object person terminal 10 according to a position specification status, a moving status, a moving speed of the object person terminals 10, the environment and time zone of the area where it is located, and the like.

Further, the storage unit 32 can also store various information acquired by the information acquisition unit 314, the watching need information acquired by the need acquisition unit 312, activity information of the person in charge of watching transmitted from the person in charge of watching, and contents of the instruction regarding watching notified to the person in charge of watching. Furthermore, the storage unit 32 can store various information such as information estimated by the estimation unit 316, information regarding settings of points that can be assigned to the person in charge of watching, information regarding the points assigned to the person in charge of watching and the counted points, identification information necessary for using the assigned points as electronic money, an exchange rate of points, and a use history of points. The information regarding the settings of the points described above is a set value such as a condition for assigning points to the person in charge of watching and a value of points assigned in a case where the conditions is satisfied, and is set in the server 30 in advance by an administrator or the like.

<Guardian Terminal 40>

The guardian terminal 40 is a terminal used by a guardian who causes an object person to carry the object person terminal 10 to acquire information regarding the position of the object person terminal 10 and protects and manages the object person. The guardian terminal 40 receives a notification from the server 30 to notify the guardian, or accesses the server 30 to acquire and display sound information of the object person and information regarding the position of the object person stored in the server 30. The guardian terminal 40 is also used as the detection terminal 20*b*, for example, by installing a dedicated application. In this case, the guardian who uses the guardian terminal 40 also functions as a person in charge of watching.

Figure 6:
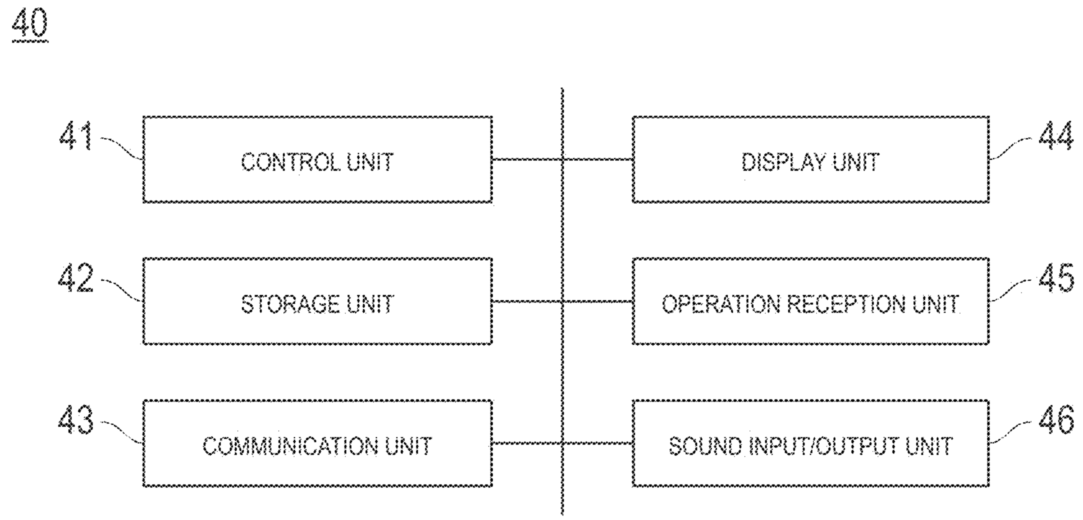
FIG. 6 is a block diagram illustrating a schematic configuration of a guardian terminal.

FIG. 6 is a block diagram illustrating a schematic configuration of a guardian terminal.

As shown in FIG. 6, the guardian terminal 40 includes a control unit 41, a storage unit 42, a communication unit 43, a display unit 44, an operation reception unit 45, and a sound input/output unit 46. The components are communicably connected to each other via a bus. Since the configurations of the control unit 41, the storage unit 42, and the communication unit 43 of the guardian terminal 40 are similar to those of the control unit 21, the storage unit 22, and the communication unit 23 of the detection terminal 20, respectively, the description thereof will be omitted.

The display unit 44 includes a liquid crystal display (LCD), an organic EL display, or the like, and displays various information.

The operation reception unit 45 includes a touch sensor, a pointing device such as a mouse, a keyboard, and the like, and receives various operations of the user. The display unit 44 and the operation reception unit 45 may constitute a touch panel by superimposing a touch sensor as the operation reception unit 45 on a display surface as the display unit 44. For example, the operation reception unit 45 receives, from the administrator, an instruction for acquiring and outputting the sound information of the object person from the server 30.

The sound input/output unit 46 includes a microphone, a sound input terminal, or the like for inputting sound, and a speaker, a sound output terminal, or the like for outputting sound. For example, the sound input/output unit 46 outputs sound corresponding to the sound information of the object person acquired from the server 30, or receives an input of the distributed sound information for distribution to the object person.

<Administrator Terminal 50>

The administrator terminal 50 is a terminal used by an administrator who manages or supervises the person in charge of watching and gives instructions to the person in charge of watching. The administrator is, for example, a user in a position of promoting and managing a local watching activity, such as a person in charge of a local government, a person in charge of school teachers or the like, a person in charge of a PTA, a person in charge of a local shopping street, or a person in charge of a local children's association. The administrator terminal 50 receives an input of watching need information, an input of an instruction regarding watching, an input of point settings, and the like from the administrator and transmits the input to the server 30.

Figure 7:
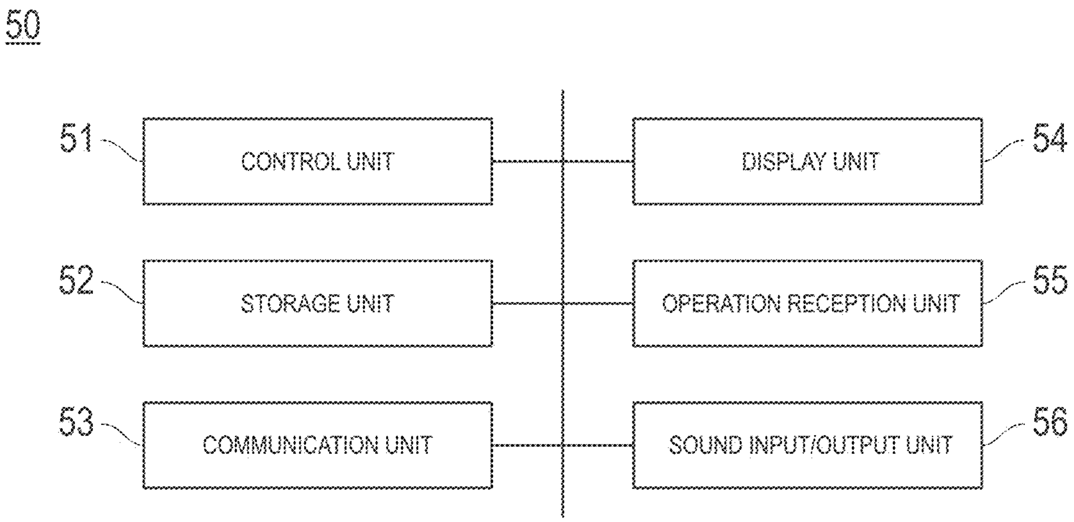
FIG. 7 is a block diagram illustrating a schematic configuration of an administrator terminal.

FIG. 7 is a block diagram illustrating a schematic configuration of an administrator terminal.

As shown in FIG. 7, the administrator terminal 50 includes a control unit 51, a storage unit 52, a communication unit 53, a display unit 54, an operation reception unit 55, and a sound input/output unit 56. The components are communicably connected to each other via a bus. Since the configurations of the control unit 51, the storage unit 52, the communication unit 53, the display unit 54, the operation reception unit 55, and the sound input/output unit 56 of the administrator terminal 50 are similar to those of the control unit 41, the storage unit 42, the communication unit 43, the display unit 44, the operation reception unit 45, and the sound input/output unit 46 of the guardian terminal 40, respectively, the description thereof will be omitted.

Note that, each of the object person terminal 10, the detection terminal 20, the server 30, the guardian terminal 40, and the administrator terminal 50 may include components other than the components described above, or may not include a part of the components described above.

<Outline of Processing>

Next, a flow of processing in the watching support system will be described.

<Position Specifying Processing>

Figure 8:
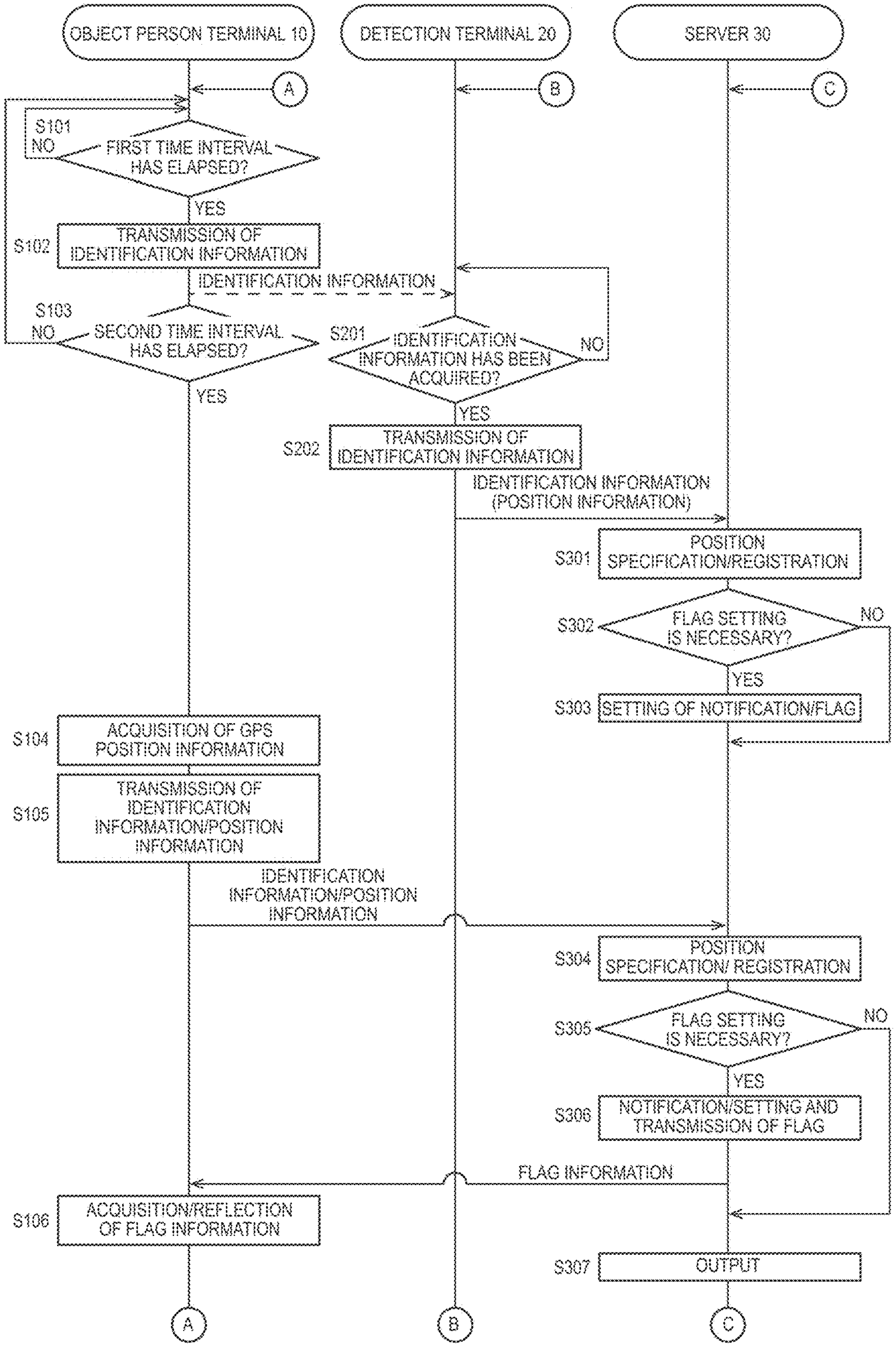
FIG. 8 is a sequence chart illustrating a flow of a position specifying processing executed in the watching support system.
Figure 9A:
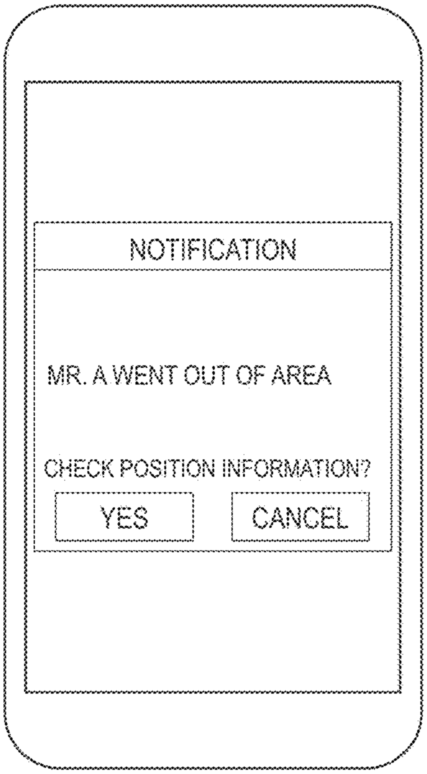
FIGS. 9A, 9B, and 9C illustrate examples of a screen expressing position information output by the server.
Figure 9B:
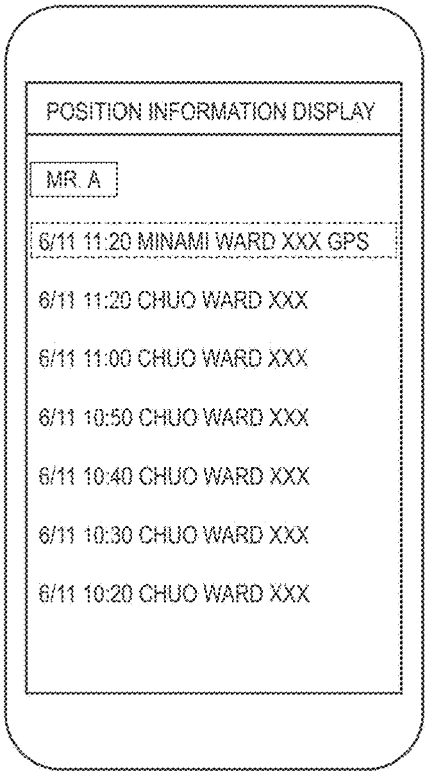
Figure 9C:
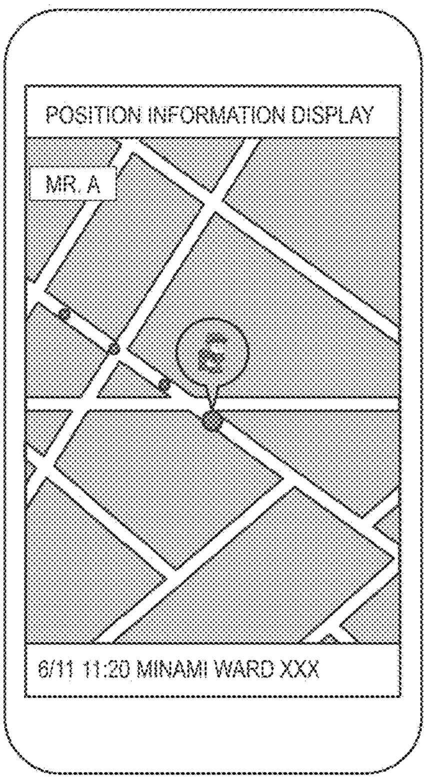

FIG. 8 is a sequence chart illustrating a flow of a position specifying processing executed in the watching support system. FIG. 9 is a diagram illustrating an example of a screen expressing position information output by the server.

First, processing of the object person terminal 10 will be described.

As shown in FIG. 8, the object person terminal 10 determines whether or not the first time interval has elapsed (step S101). In a case where the first time interval has not elapsed (step S101: NO), the object person terminal 10 waits until the first time interval has elapsed.

In a case where the first time interval has elapsed (step S101: YES), the object person terminal 10 outputs a signal for performing short-range wireless communication by the first communication unit 13, and transmits identification information for identifying the object person terminal 10 to the surroundings via short-range wireless communication (step S102). Since a relatively short time interval of about 3 seconds is set as the first time interval, the object person terminal 10 is in a state of constantly transmitting the identification information in a short cycle. As the first time interval, a constant value may be set as a fixed value, or a variable value may be set. Note that, the first communication unit 13 may output a radio wave for performing short-range wireless communication at a first time interval, and transmit the identification information to the other party when communication with the other party is established. Alternatively, the first communication unit 13 may transmit the identification information at the first time interval regardless of whether communication with the other party is established.

Subsequently, the object person terminal 10 determines whether the second time interval has elapsed (step S103). In a case where the second time interval has not elapsed (step S103: NO), the object person terminal 10 returns to the processing of step S101 and repeats the processing of performing short-range wireless communication.

In a case where the second time interval has elapsed (step S101: YES), the object person terminal 10 acquires position information of the object person terminal 10 based on a signal from a GPS satellite by the second communication unit 14 using a known technique (step S104). Then, the object person terminal 10 transmits the position information of the object person terminal 10 acquired in the processing of step S104 and the identification information for identifying the object person terminal 10 to the server 30 via long-range wireless communication (step S105). Since a relatively long time interval of about 1 hour is set as the second time interval, the object person terminal 10 transmits the identification information via short-range wireless communication in a short cycle as described above, and transmits the identification information and the position information by the GPS function to the server 30 via long-range wireless communication in a long cycle such as every hour. Note that, as described above, in a case where a value corresponding to a moving state and a moving speed of the object person terminal 10 is set as the second time interval, the object person terminal 10 uses the second time interval corresponding to its own moving state and moving speed determined from detection information of the acceleration sensor or the like.

Subsequently, in a case where the object person terminal 10 has acquired time setting flag information for changing the second time interval from the server 30 when communicating with the server 30 in the processing of step S105, the object person terminal 10 changes the second time interval based on contents of the flag information (step S106). Further, in a case where the object person terminal 10 has acquired an emergency flag or a sound distribution flag when communicating with the server 30 in the processing of step S105, the object person terminal 10 executes processing corresponding to each flag to be described later.

The object person terminal 10 repeatedly executes the processing of steps S101 to S106.

Next, processing of the detection terminal 20 will be described.

The detection terminal 20 detects an object person terminal 10 that can be communicated and determines whether or not identification information has been acquired from the object person terminal 10 (step S201). In a case where the identification information has not been acquired (step S201: NO), the detection terminal 20 continues the processing for detecting the object person terminal 10 and acquiring the identification information until the identification information can be acquired.

In a case where the identification information is acquired (step S201: YES), the detection terminal 20 transmits the acquired identification information to the server 30 (step S202).

Here, in a case where the detection terminal 20 is a fixed terminal (detection terminal 20*a*), the detection terminal 20*a* transmits information for identifying the detection terminal 20*a* to the server 30 together with the identification information. This is because the information regarding the position of each detection terminal 20*a* is stored in advance in the storage unit 32 of the server 30 in association with the information for identifying the detection terminal 20*a*. As a result, when receiving the identification information of the object person terminal 10 from the detection terminal 20*a*, the server 30 can acquire the information regarding the position of the detection terminal 20*a* from the storage unit 32 using the information for identifying the detection terminal 20*a* received together.

On the other hand, when the detection terminal 20 is a mobile terminal (detection terminal 20*b*), the detection terminal 20*b* acquires the information regarding the position of each detection terminal 20*b* based on a signal from a GPS satellite using the GPS function, and transmits the information to the server 30 together with the identification information. As a result, when receiving the identification information of the object person terminal 10 from the detection terminal 20*b*, the server 30 can acquire the information indicating the position of the detection terminal 20*b* based on the information received together.

The detection terminal 20 repeatedly executes the processing of steps S201 to S202.

Next, processing of the server 30 will be described.

The server 30 receives the identification information of the object person terminal 10 from the detection terminal 20, acquires the information regarding the position of the detection terminal 20 as described above, and specifies the position of the object person terminal 10 corresponding to the identification information based on the acquired information (step S301). The server 30 registers the identification information of the object person terminal 10 and the specified position in the storage unit 32 in association with each other.

Subsequently, the server 30 determines whether or not it is necessary to set various flags based on the position specification status of the object person terminal 10 in the processing of step S301 (step S302). For example, the server 30 determines whether or not it is necessary to change a frequency of position information acquisition using the GPS function, that is, the second time interval based on of the position specification status of the object person terminal 10, and determines whether or not it is necessary to set the time setting flag. Further, the server 30 determines whether or not it is necessary to set the emergency flag based on the position specification status of the object person terminal 10. Note that, the server 30 may individually determine whether or not it is necessary to set the time setting flag and the emergency flag based on independent conditions.

For example, in a case where the specified position of the object person terminal 10 is included in a predetermined range in the preset watching area, the server 30 determines that it is necessary to set the time setting flag and the emergency flag of the object person terminal 10. Note that, different areas can be set for the predetermined range for setting the time setting flag and the predetermined range for setting the emergency flag. For example, the predetermined range for setting the time setting flag is a peripheral area of the watching area where the object person terminal 10 is expected to go out of the watching area from now, a station or a bus stop where the object person terminal 10 can get on and off transportation such as a train or a bus that can travel a long distance, or an area including a track, a bus road or the like through which a train or a bus passes. Further, the predetermined range for setting the time setting flag and the emergency flag is, for example, an area where it is determined that the degree of risk is high from attributes (residential areas, office areas, shopping streets, entertainment districts, or the like), a security level, a traffic volume level, an enhancement level of watching (fulfillment of the detection terminals 20*a* and 20*b*), an incident/accident occurrence degree, a suspicious person information occurrence degree, a disaster occurrence degree, and the like of the area. The degree of risk for each area can be dynamically changed, for example, in a case where an incident, an accident, or a disaster occurs, an arbitrary range can be set to an area having a high degree of risk as an incident/accident occurrence area or a disaster occurrence area.

Further, the server 30 may determine that it is necessary to change the second time interval of the object person terminal 10 to be shorter in a case where it is determined that the object person terminal 10 is moving from a predetermined range such as a peripheral part of the watching area toward the outside of the watching area based on the transition of the specified position of the object person terminal 10. This is because there is a high possibility that the object person terminal 10 will go out of the watching area from now.

Further, the server 30 may determine an area including the position based on the specified position of the object person terminal 10, acquire a value of the second time interval set in advance according to the environment of the area, and determine that it is necessary to change the second time interval of the object person terminal 10 in a case where the acquired value is different from the value used in the object person terminal 10. As the environment of the area, for example, the attributes (residential areas, office areas, shopping streets, entertainment districts or the like), the security level, the traffic volume level, the enhancement level of watching (fulfillment of the detection terminals 20*a* and 20*b*), the incident/accident occurrence degree, the suspicious person information occurrence degree, the disaster occurrence degree, and the like of the area are set, and the second time interval can be set for each object person terminal 10 according to the environment of the area. Further, the attributes of the area can be dynamically changed, for example, in a case where an incident, an accident, or a disaster occurs, an arbitrary range can be set as an incident/accident occurrence area or a disaster occurrence area.

Further, the server 30 may determine an area including the position based on the specified position of the object person terminal 10, acquire a value of the second time interval set in advance according to the time zone for the area, and determine that it is necessary to change the second time interval of the object person terminal 10 in a case where the acquired value is different from the value used in the object person terminal 10. For example, the second time interval in the time zone during the daytime can be set to be longer and the second time interval in the time zone at night can be set to be shorter for an area where it is relatively safe during the daytime but the risk is high at night from a viewpoint of the security level, the traffic volume level, the enhancement level of watching, and the like.

Further, in a case where the identification information transmitted from the first communication unit 13 of the object person terminal 10 is not acquired for a predetermined time, the server 30 may determine that it is necessary to set the time setting flag and the emergency flag of the object person terminal 10 corresponding to the identification information.

Further, the server 30 may set the time setting flag and the emergency flag of the object person terminal 10 in a case where the object person terminal 10 moves from the predetermined range in the watching area to a range other than the predetermined range in the watching area based on the transition of the specified position of the object person terminal 10.

Note that, the server 30 may execute a plurality of various determination methods as described above in combination.

In a case where it is determined that it is not necessary to set various flags (step S302: NO), the server 30 proceeds to the processing of step S304 or step S301. The server 30 returns to the processing of step S301 when receiving the identification information from the detection terminal 20, and proceeds to the processing of step S304 when receiving the identification information from the object person terminal 10.

In a case where it is determined that it is necessary to set various flags (step S302: YES), the server 30 notifies the guardian terminal 40 associated in advance with the object person terminal 10, and sets the time setting flag and the emergency flag of the object person terminal 10 (step S303). By setting the time setting flag and the emergency flag as described above, when the object person terminal 10 communicates with the server by the second communication unit 14, each of the flags described above can be acquired, and corresponding processing can be executed based on the contents of the acquired flag.

Here, a notification to the guardian terminal 40 is executed, for example, by displaying a notification screen as shown in (a) of FIG. 9 on the display unit 44 of the guardian terminal 40. Alternatively, the notification to the guardian terminal 40 may be executed by transmitting a message to an electronic mail address registered in advance or an account such as various messaging applications or SNS services.

For example, when a “Yes” button is pressed on the screen shown in (a) of FIG. 9, the server 30 transmits the position information of the corresponding object person to the guardian terminal 40 (corresponding to the processing of step S307 to be described later). As a result, for example, a position information display screen as shown in (b) of FIG. 9 is displayed on the display unit 44 of the guardian terminal 40.

On the screen of (b) of FIG. 9, the transition of the position information of the object person "Mr. A" is displayed in time series from a lower side to an upper side of the screen. This screen indicates that it is detected from GPS information that Mr. A who was located in "Chuo Ward", which is a watching area, from 9:00 a.m. to 11:00 a.m., is located in "Minami Ward", which is outside the watching area, at 11:20 a.m. Further, when display of each record indicating the position information is pressed on the screen of (b) of FIG. 9, detailed position information including map information may be displayed as shown in the screen of (c) of FIG. 9. Note that, a display order and display contents of the screen are not limited to the examples described above, and the position information of the object person can be displayed by various methods. For example, when the "YES" button is pressed on the screen in (a) of FIG. 9, the screen in (c) of FIG. 9 may be displayed, and the screen in (b) of FIG. 9 may be displayed by performing a predetermined operation such as pressing of a history button.

Further, the server 30 specifies the position of the object person terminal 10 corresponding to the identification information based on the identification information and the position information transmitted from the second communication unit 14 of the object person terminal 10 (step S304). The server 30 registers the identification information of the object person terminal 10 and the specified position in the storage unit 32 in association with each other.

Subsequently, the server 30 determines whether or not it is necessary to set various flags based on the position specification status of the object person terminal 10 in the processing of step S304 (step S305).

For example, the server 30 determines whether or not it is necessary to set various flags by a method similar to the processing of step S302 described above based on the position of the object person terminal 10 specified in the processing of step S304.

Further, in a case where the position of the object person terminal specified in the processing of step S304 is outside the watching area, the server 30 may determine that it is necessary to set various flags of the object person terminal 10.

In a case where it is determined that it is not necessary to set various flags (step S305: NO), the server 30 proceeds to the processing of step S307.

In a case where it is determined that it is necessary to set various flags (step S305: YES), the server 30 notifies the guardian terminal 40 associated in advance with the object person terminal 10, sets the time setting flag and the emergency flag of the object person terminal 10, and transmits the time setting flag to the object person terminal 10 (step S306). As a result, the object person terminal 10 can acquire each of the flags described above and execute corresponding processing based on the contents of the acquired flag.

Subsequently, the server 30 outputs the information registered in the processing of step S301 and step S304, the information notified in the processing of step S303 and step S306, and the like in a viewable manner on the guardian terminal 40 (step S307). This output processing can be executed at any timing based on a request or the like from the guardian terminal 40.

Note that, in the sequence chart of FIG. 8, the description has been given as a flow in which the server 30 receives the identification information of the object person terminal 10 via the detection terminal 20, and then receives the identification information directly from the object person terminal 10, but actually the server 30 executes the processing of step S301 when receiving the identification information from the detection terminal 20 and executes the processing of step S304 when receiving the identification information from the object person terminal 10. Further, in an actual use environment of the present system, it is assumed that a plurality of object person terminals 10 and a plurality of detection terminals 20 are provided, and the server 30 executes the processing described above for each of the plurality of object person terminals 10 and the plurality of detection terminals 20.

<Emergency Information Acquisition Processing>

In a case where the emergency reception unit 151 of the object person terminal 10 receives an instruction regarding the occurrence of an emergency, regardless of a processing flow of the sequence chart of FIG. 8, the object person terminal 10 executes the processing of steps S104 and S105, acquires the position information using the GPS function, and transmits a notification indicating the occurrence of the emergency including the identification information and the position information to the server 30. At that time, the object person terminal 10 can acquire sound and images (video) around the object person terminal 10 by the acquisition unit 16 and transmit information indicating the sound and images (video) to the server 30.

Further, the instruction regarding the occurrence of the emergency described above is not limited to a form of being received by the emergency reception unit 151 of the object person terminal 10, and may be received in a form in which an emergency flag indicating the occurrence of an emergency is set in the server 30. In this case, when the object person terminal 10 periodically communicates with the server 30 and acquires the emergency flag, an instruction for notifying the occurrence of the emergency is received in the object person terminal 10, and processing of acquiring the position information using the GPS function and transmitting the position information to the server 30 and the like are executed.

<Watching Support Processing>

Next, the watching support processing will be described.

Figure 10:
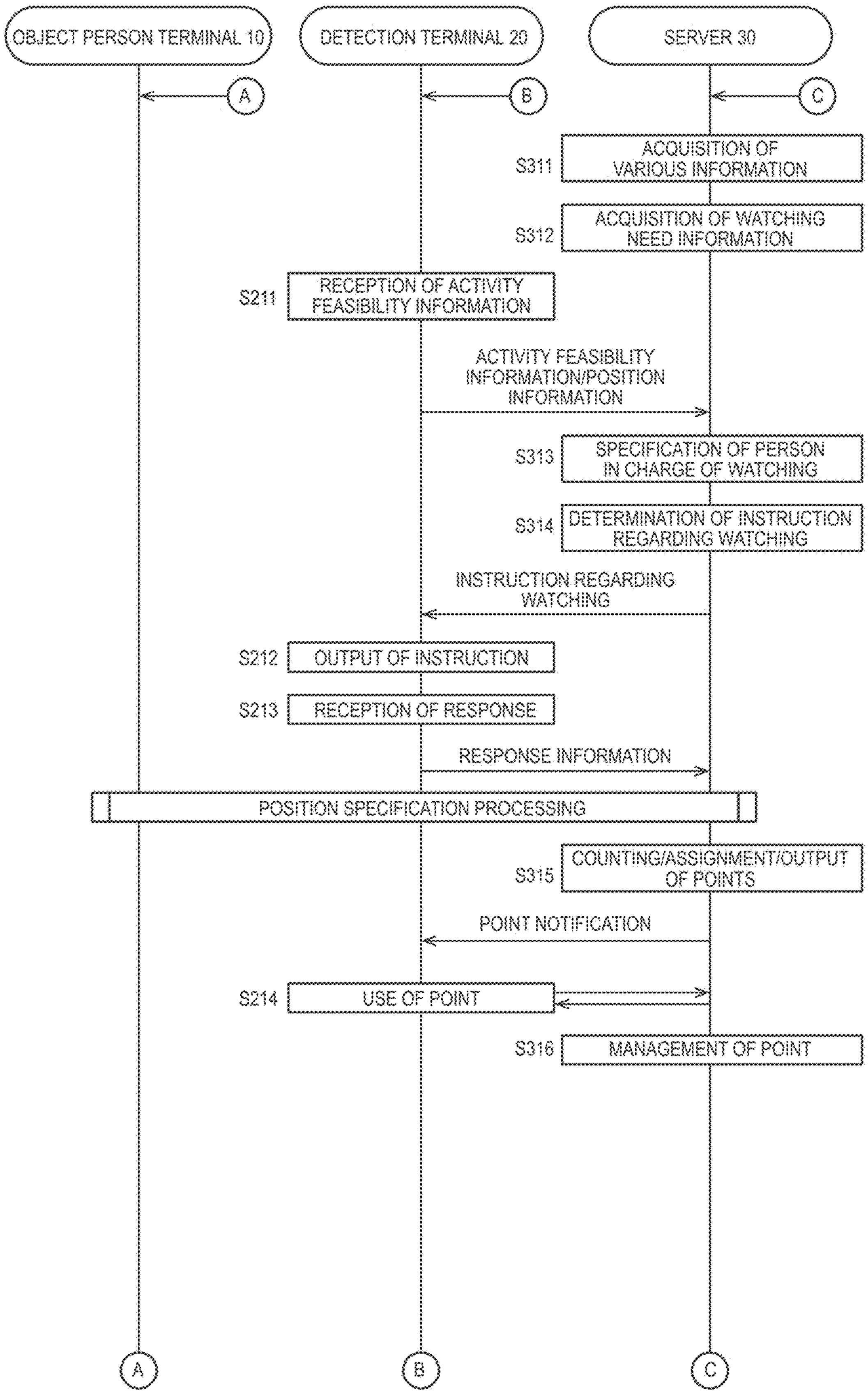
FIG. 10 is a sequence chart illustrating a flow of a watching support processing executed in the watching support system.
Figure 11:
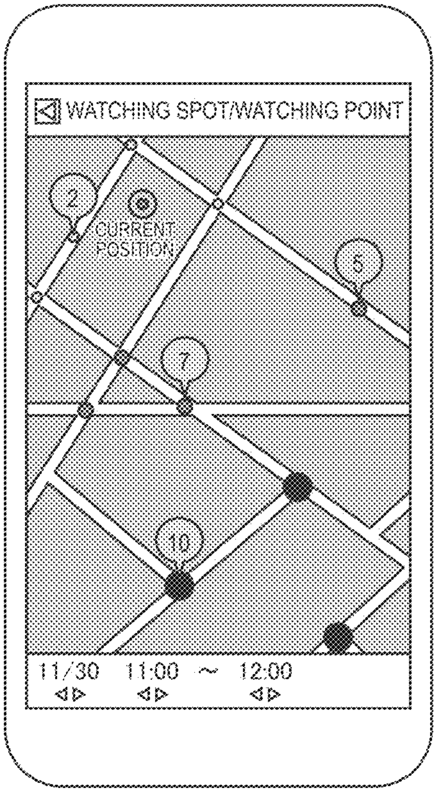
FIG. 11 is a diagram illustrating an example of a screen on which an instruction regarding watching is output.

FIG. 10 is a sequence chart illustrating a flow of the watching support processing executed in the watching support system. FIG. 11 is a diagram illustrating an example of a screen on which an instruction regarding watching is output.

As shown in FIG. 10, the server 30, as the information acquisition unit 314, acquires various information necessary or effective for determining or estimating the necessity of watching over the object person (step S311). For example, the server 30 acquires information regarding an action history of the object person, incident and accident information regarding occurrence of a traffic accident or an incident, weather information regarding weather or a weather forecast, warning information regarding occurrence of a suspicious person, a lost child, or wandering, or the like.

Subsequently, the server 30, as the need acquisition unit 312, acquires watching need information regarding the necessity of watching by the person in charge of watching (step S312). Specifically, the server 30 acquires, as the watching need information, information regarding at least one of the date and time, the day of the week, the time zone, the place, the route, and the range in which watching is required. For example, the server 30 acquires the watching need information by receiving an instruction from the person in charge of watching or a user who manages the person in charge of watching. The contents of the instruction includes the date and time, the day of the week, the time zone, the place, the route, the range, and the like in which watching is required.

Further, the server 30 may acquire the watching need information by analyzing the information acquired in the processing of step S311.

For example, in a case where the traffic volume of the object person is large in a place, time, or the like that has not been an object of watching until now, based on results of analyzing the information regarding the action history of the object person, the watching need information can be generated that indicates contents like that watching is necessary also in the place, the time, or the like.

Further, in a case where a traffic accident or an incident has occurred in a place, time, or the like that has not been an object of watching until now, for example, based on results of analyzing the incident and accident information regarding the occurrence of a traffic accident or an incident, the watching need information can be generated that indicates contents like that watching is necessary also in the place, the time, or the like, or that a plurality of persons in charge of watching are necessary.

Further, in a case where the weather is bad such as rain, snow, or wind, based on results of analyzing the information regarding weather or a weather forecast, for example, the watching need information can be generated that indicates contents like that there is a possibility that persons in charge of watching may not gather and become insufficient, or that accidents are likely to occur due to poor road surface and visibility conditions.

Further, in a case where a suspicious person, a lost child, or wandering occurs in a place, time, or the like that has not been an object of watching until now, for example, based on results of analyzing the warning information regarding the occurrence of a suspicious person, a lost child, or wandering, the watching need information can be generated that indicates contents like that watching is necessary also in the place, the time, or the like, or that a plurality of persons in charge of watching are necessary.

Further, the server 30 may acquire the watching need information by combining the contents of the received instruction and the results of analyzing the acquired various information.

Subsequently, the detection terminal 20*b* receives registration of activity feasibility information from the person in charge of watching or the like who uses the detection terminal 20*b* (step S211). The activity feasibility information is information indicating the date and time, the day of the week, the time zone, the place, the route, the range, and the like in which the person in charge of watching can perform the watching activity. For example, when the person in charge of watching inputs his or her own activity feasibility information to the detection terminal 20*b*, the detection terminal 20*b* transmits the input activity feasibility information to the server 30 together with its own position information. The server 30 registers the activity feasibility information transmitted from the detection terminal 20*b* in the storage unit 32 as the activity feasibility information of the person in charge of watching who uses the detection terminal 20*b*. Note that, the activity feasibility information may be registered by the person in charge of watching himself/herself as described above, or may be registered by an administrator, another person in charge of watching, or the like. Further, the timing at which the processing of step S211 is executed is not limited to the example illustrated in FIG. 10, and the detection terminal 20*b* can receive the activity feasibility information at any timing, and the received activity feasibility information can be transmitted to the server 30 and registered at any time.

Subsequently, the server 30 specifies a person in charge of watching who can perform watching in the date and time, the day of the week, the time zone, the place, the route, or the range in which watching is required based on the activity feasibility information and the position information transmitted from the detection terminal 20*b* of each person in charge of watching and the watching need information acquired in the processing of step S312 (step S313). The server 30 determines an instruction regarding watching to the specified person in charge of watching (step S314), and transmits the instruction to the detection terminal 20*b* of the person in charge of watching.

For example, the server 30 may specify a place or a range in which watching is required based on the watching need information, and notify an instruction regarding watching to the person in charge of watching present in the specified place or range.

Further, the server 30 may specify a date and time and a place in which watching is required based on the watching need information, and may extract a person in charge of watching including the date and time and the place as the activity feasibility information. For example, the server 30 may specify a person in charge of watching who is present closest to the place among the extracted persons in charge of watching, and notify the person in charge of watching of an instruction regarding watching to perform the watching at the date and time and the place described above.

Further, the server 30 may estimate, as the estimation unit 316, information regarding at least one of the moving distance, the number of steps, and the energy consumption amount of the person in charge of watching who carries the detection terminal 20*b* based on the position information of the detection terminal 20*b*. In this case, the server 30 may output a proposal for a walking route or a jogging route suitable for the person in charge of watching as an instruction regarding watching in consideration of the estimated information and the watching need information.

For example, in a case where the server 30 estimates that the number of steps of a certain person in charge of watching is 6000 steps per day, and in a case where the target number of steps according to the age, health condition, and the like is set to 8000 steps, the server 30 can propose, for example, a route for watching over which the person in charge of watching can walk at least another 2000 steps as a walking route suitable for the person in charge of watching. For example, the server 30 notifies, as an instruction regarding watching, a route for arriving at a place that is 1000 steps (for example, 700 m) or more away from the position where the person in charge of watching is located among places where watching is required. As a result, the person in charge of watching can walk at least 2000 steps more by going back and forth to the place where the watching is to be performed. Note that, even in a case where the moving distance or the consumed energy of the person in charge of watching is estimated, the server 30 can notify a proposal for a walking route or a jogging route suitable for the person in charge of watching as an instruction regarding watching, for example, similarly to the example of the number of steps described above.

Further, the server 30 may also notify, as an instruction regarding watching, information regarding a watching point that can be acquired by the person in charge of watching by performing watching. The information regarding the watching point includes, for example, various information necessary for assigning the watching point according to implementation of watching, such as a value of a point assigned to the person in charge of watching, a magnification of a point, a value of a bonus point assigned in a case where a special condition is satisfied.

The server 30 receives, as the reception unit 317, settings of the watching point that can be assigned to at least one of the date and time, the day of the week, the time zone, the place, the route, and the range in which watching is required from an administrator or the like in advance, and stores the settings in the storage unit 32. For example, by setting so that more points are assigned to the implementation of watching at time, a place, or the like at which the number of the person in charge of watching who can perform the watching is small even though the necessity of watching is high, it is possible to increase motivation of the person in charge of watching to perform the watching at the time, the place, or the like. As a result, a balance between demand and supply in watching can be appropriately adjusted.

Subsequently, the detection terminal 20*b* displays and outputs the instruction regarding watching transmitted from the server 30 on a display or the like (step S212). For example, the detection terminal 20*b* displays and outputs the instruction regarding watching transmitted from the server 30 by displaying a screen as shown in FIG. 11.

On the screen of FIG. 11, a map including the current position of the person in charge of watching is displayed, and a place where watching is required at a certain date and time is indicated by a circle on the map as an instruction regarding watching. Further, the size of the watching point to be assigned to the person in charge of watching at each place when the watching is performed is expressed by a number attached near the circle and the size and color (density) of the circle. By changing the date and the time displayed on the screen of FIG. 11, it is possible to arbitrarily check the place where watching is required on the date and time. Note that, the method of outputting the instruction regarding watching or information regarding the watching point is not limited to the example described above, and the instruction and the information can be output by any method. For example, a text or a figure indicating a place or a range where watching is required may be displayed, a heat map in which colors are changed depending on the necessity of watching or the size of the watching point may be displayed, or a combination thereof may be displayed. Alternatively, a screen or a message may be output that directly indicates a date and time or a place in which watching is required.

For example, when the person in charge of watching selects a place where watching is required on the screen of FIG. 11, the detection terminal 20*b* receives a response regarding the implementation of watching (step S213). The detection terminal 20*b* transmits the contents of the received response to the server 30. The server 30 can reflect the contents of the transmitted response in a subsequent instruction regarding watching. For example, in a case where a response indicating that watching will be performed at a certain place at a certain time is received from the person in charge of watching, the server 30 can determine that it is not necessary to request watching from another person in charge of watching at the place at the time. Further, the detection terminal 20*b* may receive, from the person in charge of watching, an input of information regarding a moving means to a place where watching is required, and transmit the input information to the server 30. For example, the server 30 may vary a value and an assignment rate of the watching point to be assigned according to the moving means of the person in charge of watching.

The person in charge of watching who has responded that the watching can be performed moves to a place where the watching should be performed according to the contents of the instruction, and performs the watching using the detection terminal 20*b*. Specifically, as described also in FIG. 8, the detection terminal 20*b* acquires the identification information transmitted from the object person terminal 10, and transmits the acquired identification information to the server 30 together with its own position information. The server 30 specifies the position of the object person terminal 10 based on the identification information and the position information transmitted from the detection terminal 20*b*, and outputs the position by transmitting it to the guardian terminal 40, or the like.

The server 30 determines the contents of the watching performed by the detection terminal 20*b* based on each piece of information transmitted from the detection terminal 20*b*, calculates a watching point to be assigned based on a preset condition, and assigns the watching point to the person in charge of watching (step S315). Further, the server 30 counts the watching points assigned to each person in charge of watching, and outputs the counted watching points of each person in charge of watching in a viewable manner. For example, the server 30 notifies the person in charge of watching of information regarding the watching point including the watching point assigned this time, information in which a cumulative total so far are counted, and the like. The detection terminal 20*b* displays the information regarding the watching point notified from the server 30 on a display or the like, and notifies the person in charge of watching of the watching point assigned this time, a cumulative watching point, and the like.

Further, the server 30 may notify a massage or provide a dedicated web page to each person in charge of watching so that each person in charge of watching can mutually refer to information regarding each person in charge of watching or information regarding a watching point assigned to each person in charge of watching. Furthermore, the server 30 may provide a platform such as an SNS in which each person in charge of watching can participate to mutually refer to information about each person, share information by posting information, and have a conversation by message communication individually or in a group. Further, the server 30 may be configured by a plurality of persons in charge of watching, receive settings of a group that shares the watching points, count the watching points for each group, and allow each person in charge of watching to refer to the watching points as a group and compare the watching points with the watching points of other groups.

Figure 12:
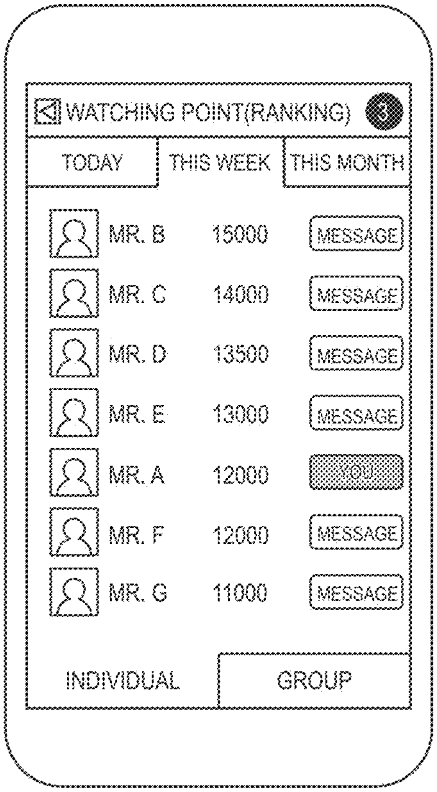
FIG. 12 is a diagram illustrating an example of a screen on which the counted watching points of each person in charge of watching are output in a viewable manner.

FIG. 12 is a diagram illustrating an example of a screen on which the counted watching points of each person in charge of watching are output in a viewable manner.

On the screen of FIG. 12, information regarding Mr. A to Mr. G, who are in charge of watching and participating in the SNS for the person in charge of watching, is displayed in a ranking format in descending order of the number of watching points acquired in the week. The screen of FIG. 12 is displayed on the display of a smartphone (detection terminal 20*b*) used by Mr. A, who is the person in charge of watching. By touching the "message" button in the screen, Mr. A can send a text message, send a sound message, or make a call to Mr. B to Mr. G, who are other persons in charge of watching. Further, the number enclosed by a black circle in an upper right corner of the screen indicates the number of newly arrived messages received by Mr. A. For example, Mr. A can check the received message by touching the number. Further, by selecting a tab such as "today", "this month", the last 0 month, or the last 0 years, it is possible to display the watching points or a ranking acquired by oneself by changing a counting period of the watching points. Further, for example, details of an acquisition status and usages of the watching points of Mr. A may be displayed by touching Mr. A's name or icon. Furthermore, although the screen of FIG. 12 displays the watching point for each individual person in charge of watching, for example, by selecting a "group" tab at a lower right corner of the screen, the acquisition status of the watching point for each group that shares the watching point is displayed.

When receiving an instruction regarding use of the watching point from the person in charge of watching, the detection terminal 20*b* communicates with the server 30 and executes processing for using the watching point (step S214). The processing for using the watching point may be processing such as an online point exchange executed between the detection terminal 20*b* and the server 30, or processing for making the watching point available as electronic money that can be used in various stores. The processing for making the watching point available as electronic money can be implemented by any method, for example, a method using a barcode or a method using a contactless IC, or the like.

For example, in the case where a barcode is used, information for identifying a person in charge of watching may be encoded and output as a form of a one-dimensional or two-dimensional barcode or the like on the display of the detection terminal 20*b*, and the barcode or the like may be read by a store terminal provided in a store or the like where the point can be used. In this case, the store terminal acquires the information for identifying the person in charge of watching from the read barcode or the like, and transmits the information to the server 30 together with the number of points to be used, information for identifying the store, and the like. Alternatively, the camera of the detection terminal 20*b* may read a barcode or the like that is provided in the store and is encoded with the information for identifying the store. In this case, the detection terminal 20*b* acquires the information for identifying the store from the read barcode or the like, and transmits the information to the server 30 together with the number of points to be used, the information for identifying the person in charge of watching, and the like.

The server 30 determines availability of points based on the various information transmitted from the store terminal or the detection terminal 20*b* as described above and information of the assigned watching point recorded for each person in charge of watching, and executes point management as electronic money by, for example, subtracting a balance of the points according to the determination result (step S316). For example, in a case where the server 30 determines that the points can be used, the server 30 transmits information indicating that fact to the store terminal or the detection terminal 20*b*, and processing of using the points (processing of subtracting the points used from the amount billed or the like) is executed.

Note that, the present invention is not limited only to the embodiments described above, and various modifications can be made within the scope of claims.

For example, in the embodiment described above, an example has been described in which whether or not it is necessary to set each flag and sets each flag is determined in the server 30, but the object person terminal 10 may execute the determination and the setting of each flag.

Further, in the processing of step S104 of FIG. 6, the description has been given assuming that the object person terminal 10 acquires the position information using the GPS function when the second time interval has elapsed, however, in a case where it can be determined from information of the acceleration sensor or the like that the position of the object person terminal 10 has not changed from the position where the position information was acquired using the GPS function last time, the use of the GPS function may be omitted and the position information acquired last time may be used as it is. As a result, power consumption by the GPS function of the object person terminal 10 can be further suppressed.

Further, in the embodiment described above, an example has been described in which each component such as the server 30 included in the watching support system is configured as one independent device, but the configuration of the device is not limited thereto. Each component may include a plurality of devices, or may be included in a device having other functions. For example, the server 30 may be configured to be distributed on a cloud server including a large number of servers. Alternatively, an application having the function of the server 30 may be installed in each device such as the detection terminal 20, the guardian terminal 40, and the administrator terminal 50, and the processing of the server 30 may be executed in each device.

Further, in the embodiment described above, an example has been described in which the object person terminal 10 is a small dedicated terminal that can be driven by a button battery, but the present invention is not limited thereto. The object person terminal 10 may be a smartphone, a tablet terminal, or the like, or may be a wearable information terminal, an embedded information terminal or the like attached to an arm, a head, or the like of the object person. Also in this case, by applying the embodiment as described above, the position of the object person is accurately, reliably, and efficiently specified while the power consumption is significantly reduced.

Further, the processing of the watching support system according to the embodiment described above may include steps other than the steps described above, or may not include a part of the steps described above. Further, the order of the steps is not limited to the embodiment described above. Furthermore, each step may be combined with another step and executed as one step, may be included in another step and executed, or may be divided into a plurality of steps and executed.

Means and methods for performing various processing in the watching support system according to the embodiment described above can be realized by either a dedicated hardware circuit or a programmed computer. The program may be provided by, for example, a computer-readable recording medium such as a flexible disk and a CD-ROM, or may be provided online via a network such as the Internet. In this case, the program recorded in the computer-readable recording medium is usually transferred to and stored in a storage unit such as a hard disk. Further, the program may be provided as an independent application software, or may be incorporated into a software of the device as one function of the watching support system.

The watching support system of the present embodiment configured as described above includes the object person terminal, the detection terminal, and the server. The object person terminal is carried by an object person and transmits identification information via short-range wireless communication. The detection terminal is carried by a person in charge of watching who detects and performs watching over the object person, and detects an object person terminal that can be communicated via short-range wireless communication. The server registers information transmitted from the object person terminal and the detection terminal. The detection terminal detects an object person terminal that can be communicated, and when the object person terminal is detected, the detection terminal acquires the identification information transmitted from the object person terminal and transmits the identification information to the server. The server acquires the identification information transmitted from the detection terminal and information regarding the position of the detection terminal, and specifies the position of the object person terminal based on the acquired identification information and the information regarding the position of the detection terminal. Further, the server acquires watching need information regarding a necessity of watching by the person in charge of watching, and outputs an instruction regarding watching to the detection terminal based on the acquired watching need information.

As described above, since the watching need information regarding the necessity of watching can be acquired, and the instruction regarding watching can be output to the detection terminal based on the acquired watching need information, the position of the object person can be detected with high power efficiency and high accuracy, and the person in charge of watching who holds the detection terminal can be efficiently and effectively arranged. Therefore, it is possible to solve and alleviate a social problem that the person in charge of watching is insufficient, which has occurred due to changes in the social environment such as an increase in double-income households and an aging of the population in recent years, by efficiently and effectively arranging the person in charge of watching. Further, for example, by having local elderly people play a role of the person in charge of watching of the present system, it is possible to improve a local watching environment while eliminating problems such as fulfillment of life, motivation in life, connection with society, loneliness, and health, which are major worries and anxiety of the elderly people.

Further, in the watching support system, the detection terminal 20*b* is provided in a moving object that moves in an area including the watching area, acquires information regarding the position of the detection terminal 20*b* based on a signal from a GPS satellite, and transmits the information to the server 30. Then, the server 30 acquires information regarding the position of the detection terminal 20*b* based on the information transmitted from the detection terminal 20*b*. As a result, an information terminal such as a smartphone carried by a person in charge of watching who moves in the watching area or a tablet PC installed in a moving taxi or the like can be used as a detection terminal. Therefore, the position of the object person terminal 10 can be accurately specified without installing fixed terminals throughout the watching area.

Further, the server 30 acquires, as the watching need information, information regarding at least one of the date and time, the day of the week, the time zone, the place, the route, and the range in which watching is required. As a result, it is possible to specifically and efficiently specify a situation in which the watching is required, and it is possible to more efficiently and effectively arrange the person in charge of watching who holds the detection terminal 20*b*.

Further, the server 30 acquires the watching need information by receiving an instruction from the person in charge of watching or an administrator who manages the person in charge of watching. As a result, the watching need information can be acquired based on the instruction of the person in charge of watching or the administrator who grasps the situation in which the watching is required in detail, and thus the person in charge of watching holding the detection terminal 20*b* can be more efficiently and effectively arranged.

Further, the server 30 further acquires information regarding the action history of the object person, and estimates the necessity of watching based on the acquired information regarding the action history of the object person, thereby acquiring the watching need information. As a result, it is possible to determine the necessity of watching based on an actual action history of the object person. Therefore, for example, it is possible to determine the time or the place in which watching is required and cause the person in charge of watching to perform the watching, even at time or a place other than the time or the place in which an object person is recognized to frequently pass, such as a school route on the way to and from school.

Further, the server 30 further acquires incident and accident information regarding the occurrence of a traffic accident or an incident, and estimates the necessity of watching in further consideration of the acquired incident and accident information, thereby acquiring the watching need information. As a result, it is possible to determine the necessity of watching based on information regarding a traffic accident or an incident that has actually occurred. Therefore, for example, it is possible to set the time or the place in which a traffic accident or incident has occurred, or the time or the place in which a traffic accident or incident is estimated to be likely to occur as the time or the place in which watching is required, and cause the person in charge of watching to preferentially perform the watching.

Further, the server 30 further acquires weather information regarding weather or a weather forecast, and estimates the necessity of watching in further consideration of the acquired weather information, thereby acquiring the watching need information. As a result, it is possible to determine the necessity of watching based on information regarding the weather or a weather forecast. Therefore, for example, on a day when the weather is bad, it is possible to notify more persons in charge of watching of an instruction regarding watching than usual, or to notify that more watching points are assigned than usual, and it is possible to more reliably and effectively arrange the person in charge of watching.

Further, the server 30 further acquires warning information regarding the occurrence of a suspicious person, a lost child, or wandering, and estimates the necessity of watching in further consideration of the acquired warning information, thereby acquiring the watching need information. As a result, it is possible to determine the necessity of watching based on occurrence information of an event that require attention or caution, such as the occurrence of a suspicious person, a lost child, or wandering, and it is possible to more reliably and effectively arrange the person in charge of watching.

Further, the server 30 notifies the person in charge of watching present in the place or range where watching is required, which is determined based on the watching need information, of an instruction regarding watching. As a result, it is possible to match the need for watching with the person in charge of watching who can perform the watching, and it is possible to effectively and efficiently construct a safe and secure environment.

Further, the server 30 receives registration of activity feasibility information regarding at least one of the date and time, the day of the week, the time zone, the place, the route, and the range in which the person in charge of watching can perform the watching activity, specifies the person in charge of watching who can perform the watching in the date and time, the day of the week, the time zone, the place, the route, or the range in which watching is required based on the activity feasibility information for which registration has been received, and notifies the specified person in charge of watching an instruction regarding watching. As a result, it is possible to match the need for watching with conditions in consideration of the conditions under which each person in charge of watching can perform the watching, and it is possible to construct a safe and secure watching environment more effectively and efficiently.

Further, the detection terminal 20_b_ outputs an instruction regarding watching, receives an input of a response regarding implementation of watching from the person in charge of watching, and transmits the response to the server 30, and the server 30 outputs the instruction regarding watching in consideration of the response transmitted from the detection terminal 20_b_. As a result, a response to the instruction to the person in charge of watching can be reflected in a new instruction regarding watching. As a result, for example, even in a case where a plurality of persons in charge of watching are notified of an instruction to perform the watching at the same place, when one person in charge of watching responds that the watching is to be performed at the place, it is possible to prevent the other persons in charge of watching from being continuously notified of duplicated instructions.

Further, the server 30 estimates information on at least one of the moving distance, the number of steps, and the energy consumption amount of the person in charge of watching who carries the detection terminal 20_b_ based on the acquired information regarding the position of the detection terminal 20_b_, and outputs a proposal for a walking route or a jogging route suitable for the person in charge of watching as an instruction regarding watching in consideration of the estimated information and the watching need information. As a result, the person in charge of watching can grasp an appropriate walking route or jogging route according to the moving distance, the number of steps, and the consumed energy while performing the watching at the time or the place in which watching is required. Therefore, the person in charge of watching can maintain and promote his/her health while feeling further motivation in life by contributing to the society. This can be strong motivation for the elderly people expected as a person in charge of watching to participate in a watching activity using the present system. Furthermore, since the elderly people possess a smartphone as the detection terminal 20_b_ in order to participate in the watching activity using the present system, it is easy for the elderly people to grasp their own location and contact their families, and thus, it is possible to construct a safe and secure society in which people can be connected and actively act.

Further, the server 30 estimates information on at least one of the moving distance, the number of steps, and the energy consumption amount of the person in charge of watching who carries the detection terminal 20_b_ in consideration of detection results of the acceleration sensor provided in the detection terminal 20_b_. As a result, the moving status of the detection terminal 20_b_ and the person in charge of watching can be grasped more accurately, a more appropriate walking route or jogging route can be proposed, and the watching point can be assigned more appropriately by grasping an implementation status of watching more accurately.

Further, the server 30 receives settings of the watching point that can be assigned to at least one of the date and time, the day of the week, the time zone, the place, the route, and the range in which watching is required, and assigns a corresponding watching point to the person in charge of watching who performed watching at the date and time, the day of the week, the time zone, the place, the route, or the range in which the watching point that can be assigned is set. As a result, for example, the watching point to be assigned can be set according to the necessity of watching for each date and time or place in which watching is required, and the fulfillment of the person in charge of watching. Therefore, for example, it is possible to motivate the person in charge of watching to perform the watching at a place where the necessity of watching is high, a place where the person in charge of watching is insufficient or the like. As a result, the person in charge of watching can be appropriately arranged, and a safe and secure watching environment can be constructed more effectively and efficiently.

Further, the server 30 further receives the settings of the watching point that can be assigned according to the moving means used when the person in charge of watching performs watching, and assigns the watching point according to the moving means used by the person in charge of watching. For example, in a case where the person moves on foot to perform the watching, which is friendly to the environment and leads to health promotion, the value of the watching point to be assigned and the value of the point magnification can be set high, and in a case where the person moves on a private car to perform the watching, the value of the watching point to be assigned and the value of the point magnification can be set low. In this case, since a high watching point can be assigned for movement on foot, it is possible to motivate the person in charge of watching to move on foot and perform the watching, leading to environmental protection and health promotion.

Further, the server 30 counts the watching points assigned to each person in charge of watching, and outputs the counted watching points of each person in charge of watching in a viewable manner. As a result, each person in charge of watching can check the watching point assigned to himself/herself, and can obtain a real sense of performing the watching, a sense of achievement due to accumulation of watching points, and the like. Further, by enabling the watching point assigned to another person in charge of watching to be checked, the persons in charge of watching can stimulate each other or promote competition, and as a result, awareness of performing the watching can be enhanced. Furthermore, for example, in a case where the local elderly people are asked to play the role of a person in charge of watching, the implementation of watching or accumulation of watching points becomes a common approach or topic among the elderly people, and communication between the elderly people can be promoted and enriched. As a result, it is possible to eliminate or alleviate the major worries and anxiety of the elderly people such as loneliness, motivation in life, and health by having them act as the person in charge of watching of the present system.

Further, the server 30 manages the counted watching points of each person in charge of watching so that the watching points can be used as electronic money. As a result, points accumulated by performing the watching can be used as electronic money including general-purpose electronic settlement means, regional money, and the like. Therefore, the motivation for the person in charge of watching to performing the watching and acquiring the watching point is further increased, and the person in charge of watching can be arranged more efficiently and effectively.

Further, the server 30 can receive settings of a group of persons in charge of watching who share watching points, counts the watching points assigned to each person in charge of watching for each group, and outputs the counted watching points of each group in a viewable manner. As a result, it is easier to for each person in charge of watching to develop a sense of camaraderie and a sense of goal achievement as a group or a team, and a sense of competition with other groups is stimulated, so that watching activities as an entire region can be activated, and communication in the region can also be activated.

The present application is based on a Japanese patent application filed on Dec. 24, 2021 (Japanese Patent Application No. 2021-210263), the disclosure of which is incorporated herein by reference in its entirety.

Note that, the following embodiments are also included in the scope of the present invention: the watching support system according to claim 1 having the features of claim 2; the watching support system according to claim 1 or 2 having the features of claim 3; the watching support system according to any one of claims 1 to 3 having the features of claim 4; the watching support system according to claim 4 having the features of claim 5; the watching support system according to claim 4 or 5 having the features of claim 6; the watching support system according to any one of claims 4 to 6 having the features of claim 7; the watching support system according to any one of claims 1 to 7 having the features of claim 8; the watching support system according to any one of claims 1 to 8 having the features of claim 9; the watching support system according to any one of claims 1 to 9 having the features of claim 10; the watching support system according to claim 11 having the features of claim 12; the watching support system according to any one of claims 1 to 12 having the features of claim 13; the watching support system according to claim 13 having the features of claim 14; the watching support system according to claim 13 or 14 having the features of claim 15; the watching support system according to claim 15 having the features of claim 16; the watching support system according to claim 15 or 16 having the features of claim 17; and a watching support program for causing an information processing device to function as the watching support device according to claim 18.

REFERENCE SIGNS LIST

10 object person terminal
11 control unit
12 storage unit
13 first communication unit
14 second communication unit
15 reception unit
151 emergency reception unit
152 acquisition instruction reception unit
16 acquisition unit
17 output unit
171 sound output unit
172 light output unit
20, 20*a*, 20*b* detection terminal
21 control unit
22 storage unit
23 communication unit
24 detection unit
30 server
31 control unit
32 storage unit
33 communication unit
40 guardian terminal
41 control unit
42 storage unit
43 communication unit
44 display unit
45 operation reception unit
46 sound input/output unit
50 administrator terminal
51 control unit
52 storage unit
53 communication unit
54 display unit
55 operation reception unit
56 sound input/output unit

The invention claimed is:

1. A watching support system comprising:

an object person terminal that is carried by an object person and transmits identification information via short-range wireless communication;

a detection terminal that is carried by a person in charge of watching who detects and performs watching over the object person, and detects the object person terminal that can be communicated via short-range wireless communication; and a server that registers information transmitted from the object person terminal and the detection terminal, wherein the detection terminal includes:

a detection unit that detects the object person terminal that can be communicated; and a transmission unit that acquires the identification information transmitted from the object person terminal and transmits the identification information to the server in a case where the object person terminal is detected by the detection unit, and the server includes:

a specification unit that acquires the identification information transmitted from the detection terminal and information regarding a position of the detection terminal, and specify a position of the object person terminal based on the acquired identification information and the acquired information regarding the position of the detection terminal;

a need acquisition unit that acquires watching need information regarding a necessity of the watching by the person in charge of watching; and an output unit that outputs an instruction regarding the watching to the detection terminal based on the watching need information acquired by the need acquisition unit, wherein the server further includes an information acquisition unit that acquires information regarding an action history of the object person, and the need acquisition unit acquires the watching need information by estimating a necessity of the watching based on information regarding the action history of the object person acquired by the information acquisition unit.

2. The watching support system according to claim 1, wherein the need acquisition unit acquires, as the watching need information, information regarding at least one of a date and time, a day of the week, a time zone, a place, a route, and a range in which watching is required.

3. The watching support system according to claim 1, wherein the information acquisition unit further acquires incident and accident information regarding occurrence of a traffic accident or an incident, and the need acquisition unit acquires the watching need information by estimating a necessity of the watching in further consideration of the incident and accident information acquired by the information acquisition unit.

4. The watching support system according to claim 1, wherein the information acquisition unit further acquires weather information regarding weather or a weather forecast, and the need acquisition unit acquires the watching need information by estimating a necessity of the watching in further consideration of the weather information acquired by the information acquisition unit.

5. The watching support system according to claim 1, wherein the information acquisition unit further acquires warning information regarding occurrence of a suspicious person, a lost child, or wandering, and the need acquisition unit acquires the watching need information by estimating a necessity of the watching in further consideration of the warning information acquired by the information acquisition unit.

6. The watching support system according to claim 1, wherein the output unit notifies the person in charge of watching who is present in a place or a range where watching is required, which is determined based on the watching need information, of an instruction regarding the watching.

7. The watching support system according to claim 1, further comprising a registration unit that receives registration of activity feasibility information regarding at least one of a date and time, a day of the week, a time zone, a place, a route, and a range in which the person in charge of watching can perform a watching activity, wherein the output unit specifies the person in charge of watching who can perform watching in a date and time, a day of the week, a time zone, a place, a route, or a range in which watching is required based on the activity feasibility information for which registration has been received in the registration unit, and notifies the specified person in charge of watching of an instruction regarding the watching.

8. The watching support system according to claim 1, wherein the detection terminal outputs the instruction regarding the watching, receives an input of a response regarding implementation of the watching from the person in charge of watching, and transmits the received response to the server, and the output unit outputs the instruction regarding the watching in consideration of the response transmitted from the detection terminal.

9. A watching support system comprising:

an object person terminal that is carried by an object person and transmits identification information via short-range wireless communication;

a detection terminal that is carried by a person in charge of watching who detects and performs watching over the object person, and detects the object person terminal that can be communicated via short-range wireless communication; and a server that registers information transmitted from the object person terminal and the detection terminal, wherein the detection terminal includes:

a detection unit that detects the object person terminal that can be communicated; and a transmission unit that acquires the identification information transmitted from the object person terminal and transmits the identification information to the server in a case where the object person terminal is detected by the detection unit, and the server includes:

a specification unit that acquires the identification information transmitted from the detection terminal and information regarding a position of the detection terminal, and specify a position of the object person terminal based on the acquired identification information and the acquired information regarding the position of the detection terminal;

a need acquisition unit that acquires watching need information regarding a necessity of the watching by the person in charge of watching; and an output unit that outputs an instruction regarding the watching to the detection terminal based on the watching need information acquired by the need acquisition unit, the watching support system further comprising:

an estimation unit that estimates information on at least one of a moving distance, the number of steps, and an energy consumption amount of the person in charge of watching who carries the detection terminal based on information regarding the position of the detection terminal acquired by the specification unit, wherein the output unit outputs a proposal of a walking route or a jogging route suitable for the person in charge of watching as the instruction regarding the watching in consideration of information estimated by the estimation unit and the watching need information.

10. The watching support system according to claim 9, wherein the estimation unit estimates information on at least one of a moving distance, the number of steps, and an energy consumption amount of the person in charge of watching who carries the detection terminal in consideration of detection results of an acceleration sensor provided in the detection terminal.

11. A watching support system comprising:

an object person terminal that is carried by an object person and transmits identification information via short-range wireless communication;

a detection terminal that is carried by a person in charge of watching who detects and performs watching over the object person, and detects the object person terminal that can be communicated via short-range wireless communication; and a server that registers information transmitted from the object person terminal and the detection terminal, wherein the detection terminal includes:

a detection unit that detects the object person terminal that can be communicated; and a transmission unit that acquires the identification information transmitted from the object person terminal and transmits the identification information to the server in a case where the object person terminal is detected by the detection unit, and the server includes:

a specification unit that acquires the identification information transmitted from the detection terminal and information regarding a position of the detection terminal, and specify a position of the object person terminal based on the acquired identification information and the acquired information regarding the position of the detection terminal;

a need acquisition unit that acquires watching need information regarding a necessity of the watching by the person in charge of watching; and an output unit that outputs an instruction regarding the watching to the detection terminal based on the watching need information acquired by the need acquisition unit, the watching support system further comprising:

a reception unit that receives settings of a watching point that can be assigned to at least one of a date and time, a day of the week, a time zone, a place, a route, and a range in which watching is required; and an assignment unit that assigns a corresponding watching point to the person in charge of watching who performed the watching at a date and time, a day of the week, a time zone, a place, a route, or a range in which the watching point that can be assigned is set by the reception unit.

12. The watching support system according to claim 11, wherein the reception unit further receives settings of a watching point that can be assigned according to a moving means used when the person in charge of watching performs the watching, and the assignment unit assigns the watching point according to the moving means used by the person in charge of watching.

13. The watching support system according to claim 11, further comprising a counting unit that counts the watching points assigned by the assignment unit to each person in charge of watching, wherein the output unit outputs the watching point of each person in charge of watching counted by the counting unit in a viewable manner.

14. The watching support system according to claim 13, further comprising a management unit that manages the watching points of each person in charge of watching counted by the counting unit, so that they can be usable as electronic money.

15. The watching support system according to claim 13, wherein the counting unit is capable of receiving settings of a group of the persons in charge of watching who share the watching points, and counts the watching points assigned to each person in charge of watching by the assignment unit for each group, and the output unit outputs the watching points of each group counted by the counting unit in a viewable manner.

16. A watching support device applied to a watching support system, wherein the watching support system including:

an object person terminal that is carried by an object person and transmits identification information via short-range wireless communication; and a detection terminal that is carried by a person in charge of watching who detects and performs watching over the object person and includes a detection unit that detects the object person terminal that can be communicated via short-range wireless communication and a transmission unit that acquires and transmits the identification information transmitted from the object person terminal in a case where the object person terminal is detected by the detection unit, and the watching support device comprising:

a specification unit that acquires the identification information transmitted from the detection terminal and information regarding a position of the detection terminal, and specify a position of the object person terminal based on the acquired identification information and the acquired information regarding the position of the detection terminal;

a need acquisition unit that acquires watching need information regarding a necessity of the watching by the person in charge of watching; and an output unit that outputs an instruction regarding the watching to the detection terminal based on the watching need information acquired by the need acquisition unit, the watching support device further comprising:

an information acquisition unit that acquires information regarding an action history of the object person, wherein the need acquisition unit acquires the watching need information by estimating a necessity of the watching based on information regarding the action history of the object person acquired by the information acquisition unit.

17. A watching support device applied to a watching support system, wherein the watching support system including:

an object person terminal that is carried by an object person and transmits identification information via short-range wireless communication; and a detection terminal that is carried by a person in charge of watching who detects and performs watching over the object person and includes a detection unit that detects the object person terminal that can be communicated via short-range wireless communication and a transmission unit that acquires and transmits the identification information transmitted from the object person terminal in a case where the object person terminal is detected by the detection unit, and the watching support device comprising:

a specification unit that acquires the identification information transmitted from the detection terminal and information regarding a position of the detection terminal, and specify a position of the object person terminal based on the acquired identification information and the acquired information regarding the position of the detection terminal;

a need acquisition unit that acquires watching need information regarding a necessity of the watching by the person in charge of watching; and an output unit that outputs an instruction regarding the watching to the detection terminal based on the watching need information acquired by the need acquisition unit, the watching support device further comprising:

an estimation unit that estimates information on at least one of a moving distance, the number of steps, and an energy consumption amount of the person in charge of watching who carries the detection terminal based on information regarding the position of the detection terminal acquired by the specification unit, wherein the output unit outputs a proposal of a walking route or a jogging route suitable for the person in charge of watching as the instruction regarding the watching in consideration of information estimated by the estimation unit and the watching need information.

18. A watching support device applied to a watching support system, wherein the watching support system including:

an object person terminal that is carried by an object person and transmits identification information via short-range wireless communication; and a detection terminal that is carried by a person in charge of watching who detects and performs watching over the object person and includes a detection unit that detects the object person terminal that can be communicated via short-range wireless communication and a transmission unit that acquires and transmits the identification information transmitted from the object person terminal in a case where the object person terminal is detected by the detection unit, and the watching support device comprising:

a specification unit that acquires the identification information transmitted from the detection terminal and information regarding a position of the detection terminal, and specify a position of the object person terminal based on the acquired identification information and the acquired information regarding the position of the detection terminal;

a need acquisition unit that acquires watching need information regarding a necessity of the watching by the person in charge of watching; and an output unit that outputs an instruction regarding the watching to the detection terminal based on the watching need information acquired by the need acquisition unit, the watching support device further comprising:

a reception unit that receives settings of a watching point that can be assigned to at least one of a date and time, a day of the week, a time zone, a place, a route, and a range in which watching is required; and an assignment unit that assigns a corresponding watching point to the person in charge of watching who performed the watching at a date and time, a day of the week, a time zone, a place, a route, or a range in which the watching point that can be assigned is set by the reception unit.

19. A non-transitory recording medium storing a computer readable watching support program for causing an information processing device to function as the watching support device according to claim 16.

* * * * *